(12) United States Patent
Kobayashi et al.

(10) Patent No.: US 8,587,237 B2
(45) Date of Patent: Nov. 19, 2013

(54) CONTROL DEVICE

(75) Inventors: Yasuhiko Kobayashi, Anjo (JP); Jin Izawa, Obu (JP)

(73) Assignee: Aisin AW Co., Ltd., Anjo (JP)

( * ) Notice: Subject to any disclaimer, the term of this patent is extended or adjusted under 35 U.S.C. 154(b) by 170 days.

(21) Appl. No.: 13/238,779

(22) Filed: Sep. 21, 2011

(65) Prior Publication Data

US 2012/0081051 A1 Apr. 5, 2012

(30) Foreign Application Priority Data

Sep. 30, 2010 (JP) ................................. 2010-222963

(51) Int. Cl.
*H02K 29/06* (2006.01)

(52) U.S. Cl.
USPC ................. 318/400.23; 318/371; 318/400.15; 318/400.07; 318/434; 701/41; 701/31.4; 701/22; 701/87; 701/90; 280/108; 280/124.108; 280/5.507

(58) Field of Classification Search
USPC .............. 318/400.23, 611, 430, 432, 67, 139, 318/448, 460; 180/446, 197, 65.25, 65.285, 180/65.29, 65.27, 282, 65.26; 701/69, 159, 701/51, 54, 41, 31.4, 22, 37, 42; 74/335, 74/330, 333; 477/109, 5, 8, 6; 123/90.15, 123/192.1; 303/159
See application file for complete search history.

(56) References Cited

U.S. PATENT DOCUMENTS

| | | | |
|---|---|---|---|
| 6,622,805 B2 * | 9/2003 | Nakashima | 180/65.25 |
| 6,890,284 B2 * | 5/2005 | Sakamoto et al. | 477/109 |
| 6,966,867 B2 * | 11/2005 | Tajima et al. | 477/7 |
| 7,423,393 B2 * | 9/2008 | Wakao et al. | 318/371 |
| 7,516,006 B2 * | 4/2009 | Mori | 701/69 |
| 2004/0204290 A1 * | 10/2004 | Ito | 477/175 |
| 2005/0115346 A1 * | 6/2005 | Sakamoto et al. | 74/335 |
| 2006/0025906 A1 * | 2/2006 | Syed et al. | 701/22 |
| 2010/0019709 A1 * | 1/2010 | Le Neindre et al. | 318/400.23 |
| 2011/0035090 A1 * | 2/2011 | Noguchi et al. | 701/29 |
| 2011/0266760 A1 * | 11/2011 | Itabashi | 280/5.507 |

FOREIGN PATENT DOCUMENTS

| | | |
|---|---|---|
| JP | A-2000-125410 | 4/2000 |
| JP | A-2000-217209 | 8/2000 |
| JP | A-2001-028809 | 1/2001 |
| JP | A-2005-269836 | 9/2005 |
| JP | A-2010-200587 | 9/2010 |

OTHER PUBLICATIONS

Dec. 20, 2011 (mail date) International Search Report issued in International Application No. PCT/JP2011/071853.

* cited by examiner

*Primary Examiner* — Eduardo Colon Santana
*Assistant Examiner* — Jorge Carrasquillo
(74) *Attorney, Agent, or Firm* — Oliff & Berridge, PLC

(57) ABSTRACT

A control device configured with an external input estimator that reduces a vibration component of a rotational speed of the power transfer system at a rotational speed of the rotary electric machine and estimates transfer system input torque on the basis of the rotational speed of the rotary electric machine, and that estimates external input torque by subtracting at least output torque of the rotary electric machine from the transfer system input torque. A low-vibration speed calculator calculates a low-vibration rotational speed on the basis of the external input torque and vehicle required torque. A rotational speed controller calculates feedback command torque that matches the rotational speed of the rotary electric machine with the low-vibration rotational speed. A torque command value calculator calculates an output torque command value on the basis of the vehicle required torque and the feedback command torque.

11 Claims, 13 Drawing Sheets

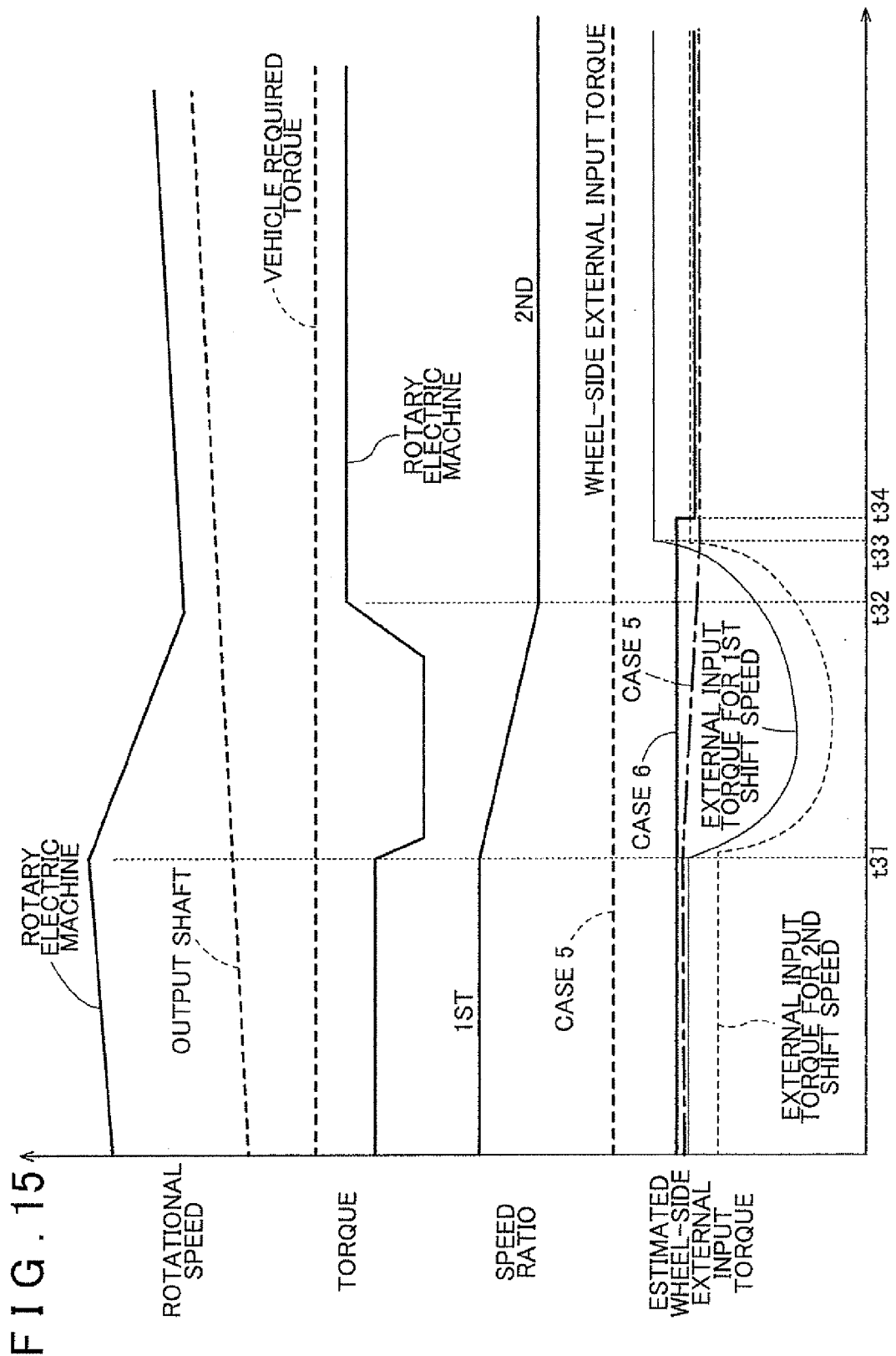

CONTROL DEVICE

INCORPORATION BY REFERENCE

The disclosure of Japanese Patent Application No. 2010-222963 filed on Sep. 30, 2010 including the specification, drawings and abstract is incorporated herein by reference in its entirety.

BACKGROUND OF THE INVENTION

The present invention relates to a control device that controls a rotary electric machine that is provided in a power transfer system from a drive force source for a vehicle to wheels and serves as the drive force source.

DESCRIPTION OF THE RELATED ART

As the control device described above, Japanese Patent Application Publication No. JP-A-2001-28809 mentioned below, for example, discloses a vibration suppression control device described below. The vibration suppression control device performs vibration suppression control in which shaft torsional vibration produced in a power transfer system is suppressed by controlling output torque of a rotary electric machine when starting a vehicle including the rotary electric machine as a drive force source of the rotary electric machine. In the technique according to JP-A-2001-28809, disturbance torque is estimated on the basis of the output torque of the rotary electric machine and the rotational speed of the rotary electric machine, and the estimated disturbance torque is multiplied by a control gain to calculate control torque. Then, in the technique according to JP-A-2001-28809, the control torque is added to required torque to calculate a torque command value for the rotary electric machine. Therefore, in the technique according to JP-A-2001-28809, the torque command value is increased and decreased so as to cancel the disturbance torque.

In the technique according to JP-A-2001-28809, vibration is suppressed by canceling the disturbance torque. In the case where the disturbance torque is running resistance torque, such as slope resistance, air resistance, and tire friction resistance, brake torque, and so forth, however, acceleration and deceleration of the vehicle may vary irrespective of the running state or a brake operation if such disturbance torque is canceled, causing a discomfort to a driver.

SUMMARY OF THE INVENTION

Thus, there is desired a control device for a rotary electric machine capable of suppressing shaft torsional vibration produced in a power transfer system of a vehicle without canceling disturbance torque such as running resistance torque and brake torque.

A first aspect of the present invention provides a control device that controls a rotary electric machine that is provided in a power transfer system from a drive force source for a vehicle to wheels and serves as the drive force source. The control device includes: an external input estimator that reduces a vibration component of a rotational speed of the power transfer system at a rotational speed of the rotary electric machine and estimates transfer system input torque, which is torque input to the power transfer system, on the basis of the rotational speed of the rotary electric machine, and that estimates external input torque, which is input from the wheels to the power transfer system, by subtracting at least output torque of the rotary electric machine from the transfer system input torque; a low-vibration speed calculator that calculates a low-vibration rotational speed, which is a rotational speed obtained by reducing a vibration component produced in the rotational speed of the rotary electric machine, on the basis of the external input torque and vehicle required torque, which is torque required to drive the wheels; a rotational speed controller that calculates feedback command torque that matches the rotational speed of the rotary electric machine with the low-vibration rotational speed; and a torque command value calculator that calculates an output torque command value, which is a command value of the output torque of the rotary electric machine, on the basis of the vehicle required torque and the feedback command torque.

The term "rotary electric machine" as used herein refers to any of a motor (electric motor), a generator (electric generator), and a motor generator that functions both as a motor and as a generator as necessary.

According to the first aspect, even if the rotational speed of the rotary electric machine is vibrating at the natural vibration frequency of the power transfer system or the like, the external input estimator can estimate the transfer system input torque input to the power transfer system well by reducing a vibration component at the natural vibration frequency or the like. An estimated value of the external input torque is computed by subtracting the output torque of the rotary electric machine from the estimated transfer system input torque. Thus, torque input to the power transfer system other than the output torque of the rotary electric machine can be estimated with high accuracy. Therefore, the external input torque input from the wheels to the power transfer system can be estimated with high accuracy.

According to the above first aspect, in addition, the low-vibration rotational speed is calculated on the basis of an estimated value of the external input torque, in which a vibration component has been reduced, and the vehicle required torque. Thus, a rotational speed obtained by reducing a vibration component produced in the rotational speed of the rotary electric machine can be used as a target value for rotational speed control. Therefore, feedback command torque that reduces a vibration component of the rotational speed of the rotary electric machine can be calculated.

Moreover, the low-vibration rotational speed, which is used as the target rotational speed of the rotary electric machine, is calculated on the basis of the estimated external input torque, in addition to the vehicle required torque. Thus, a target rotational speed that will not cancel the external input torque can be calculated by reflecting the external input torque, such as running resistance torque and brake torque, in the vehicle required torque. Therefore, the vibration component of the rotational speed of the rotary electric machine can be reduced while maintaining acceleration and deceleration of the vehicle due to the running condition, a brake operation, or the like.

According to a second aspect of the present invention, the external input estimator may estimate the transfer system input torque by performing, on the rotational speed of the rotary electric machine, a multiplication process using a moment of inertia of the power transfer system, a differential computation process, and signal processing for reducing at least a vibration component of the power transfer system, and estimate the external input torque by subtracting the output torque of the rotary electric machine from the transfer system input torque, and the low-vibration speed calculator may calculate the low-vibration rotational speed by performing, on torque obtained by adding the external input torque and the vehicle required torque, a division process using the moment of inertia of the power transfer system and an integral computation process.

According to the second aspect, the rotational speed of the rotary electric machine, in which a vibration component such as the natural vibration frequency of the power transfer system has been reduced, can be estimated. Then, by performing a multiplication process using the moment of inertia of the power transfer system and a differential computation process on the estimated rotational speed, the transfer system input torque input to the power transfer system can be estimated with high accuracy with a reduced effect of the vibration component.

Then, the external input torque can be estimated with high accuracy by subtracting the output torque of the rotary electric machine from the estimated transfer system input torque with high accuracy.

According to a third aspect of the present invention, the rotary electric machine may be selectively drivably coupled to an internal combustion engine serving as the drive force source in accordance with an engagement state of an engagement device, and at least during a change in transfer torque capacity of the engagement device, the external input estimator may hold the external input torque estimated before the change in transfer torque capacity of the engagement device.

According to the third aspect, during a change in transfer torque capacity of the engagement device, torque may be transferred from the engagement device to the rotary electric machine side, causing variations in transfer system input torque. In this state, an estimation error may be easily caused in the transfer system input torque. According to the above third aspect, the external input torque estimated before a change in transfer torque capacity of the engagement device is held during the change in transfer torque capacity of the engagement device, preventing occurrence of an estimation error.

According to a fourth aspect of the present invention, the rotary electric machine may be selectively drivably coupled to an internal combustion engine serving as the drive force source in accordance with an engagement state of an engagement device, and in a slipping engagement state, in which a transfer torque capacity is produced with a difference in rotational speed between engagement members of the engagement device, the external input estimator may estimate the external input torque by subtracting the output torque of the rotary electric machine and slipping torque, which is transfer torque of the engagement device, from the transfer system input torque.

According to the fourth aspect, in the case where slipping torque is transferred from the engagement device to the rotary electric machine side, torque other than the external input torque can be subtracted from the transfer system input torque by subtracting the slip torque, in addition to the output torque of the rotary electric machine, from the estimated transfer system input torque. Therefore, the accuracy in estimating the external input torque can be improved even in the case where slipping torque is transferred.

According to a fifth aspect of the present invention, the rotary electric machine may be selectively drivably coupled to an internal combustion engine serving as the drive force source in accordance with an engagement state of an engagement device, and the rotational speed controller may calculate the feedback command torque during at least a part of a period since the transfer torque capacity starts being produced between engagement members of the engagement device until a direct engagement state, in which rotational speeds of the engagement members of the engagement device match each other, is established in order to start the internal combustion engine through torque transfer from the rotary electric machine to the internal combustion engine via the engagement device.

When the transfer torque capacity of the engagement device is changed to start the internal combustion engine, the output torque of the rotary electric machine, the output torque of the internal combustion engine, and the transfer torque of the engagement device may vary significantly, and shaft torsional vibration of the power transfer system may be produced easily. According to the above fifth aspect, the feedback command torque is calculated during at least a part of a period to start the internal combustion engine, effectively suppressing vibration.

According to a sixth aspect of the present invention, the rotary electric machine may be drivably coupled to the wheels via a speed change mechanism with a changeable speed ratio, and during an operation to change the speed ratio performed by the speed change mechanism, the external input estimator may estimate wheel-side input torque, which is torque input to a side of the wheels, on the basis of an output rotational speed, which is a rotational speed of an output member provided on the side of the wheels with respect to the speed change mechanism in the power transfer system, in place of the rotational speed of the rotary electric machine, estimate wheel-side external input torque, which is input from the wheels to the output member, by subtracting the output torque of the rotary electric machine or torque obtained by multiplying the vehicle required torque by the speed ratio from the wheel-side input torque, and estimate the external input torque by dividing the wheel-side external input torque by the speed ratio.

During an operation to change the speed ratio performed by the speed change mechanism, the state of coupling between the rotary electric machine side and the wheels side varies. Thus, information on the external input torque input to the wheels side may not be transferred well to the rotational speed of the rotary electric machine. According to the above sixth aspect, during a speed change operation, information on the external input torque is estimated on the basis of the rotational speed on the wheels side with respect to the speed change mechanism, in place of the rotational speed of the rotary electric machine. Thus, information on the external input torque input to the wheels side can be estimated even if the state of coupling varies. In addition, the external input torque input to the wheels is multiplied by the speed ratio. Thus, the external input torque can be estimated based on the rotary electric machine side, as in the case where the external input torque is estimated on the basis of the rotational speed of the rotary electric machine.

According to a seventh aspect of the present invention, the rotary electric machine may be drivably coupled to the wheels via a speed change mechanism with a changeable speed ratio, and the external input estimator may include a plurality of speed ratio-specific estimators having different constants set for each speed ratio, each of the speed ratio-specific estimators is configured to calculate the external input torque for each speed ratio in parallel, and during an operation to change the speed ratio performed by the speed change mechanism, the speed ratio-specific estimator corresponding to the speed ratio before the speed change operation may hold the external input torque estimated before the speed change operation.

According to the seventh aspect, an estimated value of the external input torque being held is output during an operation to change the speed ratio, preventing occurrence of an estimation error during the speed change operation. In addition, only an estimated value before the speed change operation is held. Thus, an estimated value corresponding to the speed ratio after the speed change operation can be calculated in parallel during the speed change operation, allowing output of an estimated value without delay after the speed change operation.

According to an eighth aspect of the present invention, the rotary electric machine may be selectively drivably coupled to an internal combustion engine serving as the drive force source in accordance with an engagement state of an engagement device, and in a direct engagement state, in which a transfer torque capacity is produced with no difference in rotational speed between engagement members of the engagement device, the external input estimator may estimate the external input torque by subtracting the output torque of the rotary electric machine and output torque of the internal combustion engine from the transfer system input torque.

In the case where the engagement device is in the direct engagement state, the output torque of the internal combustion engine is transferred from the internal combustion engine to the rotary electric machine side. According to the above eighth aspect, in the case where the engagement device is in the direct engagement state, torque other than the external input torque can be subtracted from the transfer system input torque by subtracting the output torque of the internal combustion engine, in addition to the output torque of the rotary electric machine, from the estimated transfer system input torque. Therefore, the accuracy in estimating the external input torque can be maintained even in the case where the output torque of the internal combustion engine is transferred.

According to a ninth aspect of the present invention, the external input estimator may estimate the transfer system input torque by performing, on the rotational speed of the rotary electric machine, signal processing set on the basis of an inverse of characteristics of transfer from the output torque of the rotary electric machine to the rotational speed of the rotary electric machine, and estimate the external input torque by subtracting the output torque of the rotary electric machine from the transfer system input torque.

According to the ninth aspect, the vibration component of the power transfer system can be reduced well on the basis of the inverse of the characteristics of transfer in the power transfer system. Therefore, the accuracy in estimating the transfer system input torque can be improved, improving the accuracy in estimating the external input torque.

According to a tenth aspect of the present invention, the rotary electric machine may be selectively drivably coupled to an internal combustion engine serving as the drive force source in accordance with an engagement state of an engagement device, and drivably coupled to the wheels via a speed change mechanism with a changeable speed ratio, and control constants of the external input estimator, the low-vibration speed calculator, and the rotational speed controller may be changed in accordance with one or both of the engagement state of the engagement device and the speed ratio of the speed change mechanism.

According to the tenth aspect, the control constants can be set so as to be adapted to the transfer characteristics of the power transfer system, which vary in accordance with the engagement state or the speed ratio. Therefore, the accuracy in estimating the external input torque, the accuracy in calculating the low-vibration rotational speed, and the accuracy in calculating the feedback command torque can be improved for the engagement state or the speed ratio, thus improving the control performance of the vibration suppression rotational speed control.

According to an eleventh aspect of the present invention, the low-vibration speed calculator may set an initial value of the low-vibration rotational speed to a rotational speed obtained by performing a filtering process for reducing the vibration component of the rotational speed of the rotary electric machine on the rotational speed of the rotary electric machine.

According to the eleventh aspect, variations in rotational speed of the rotary electric machine can be dulled through filtering even if the rotational speed of the rotary electric machine is varied because of noise or vibration. Thus, an initial value of the low-vibration rotational speed from which noise or vibration has been removed can be calculated. Therefore, the accuracy in calculating the low-vibration rotational speed can be improved.

BRIEF DESCRIPTION OF THE DRAWINGS

FIGS. 3A to 3C show models of a power transfer system according to the embodiment of the present invention, in which FIG. 3A shows a base model, FIG. 3B shows an non-directly coupled model, and FIG. 3C shows a directly coupled model;

FIG. 15 is a time chart illustrating a process performed by the control device according to the embodiment of the present invention.

DETAILED DESCRIPTION OF THE EMBODIMENT

Figure 1:
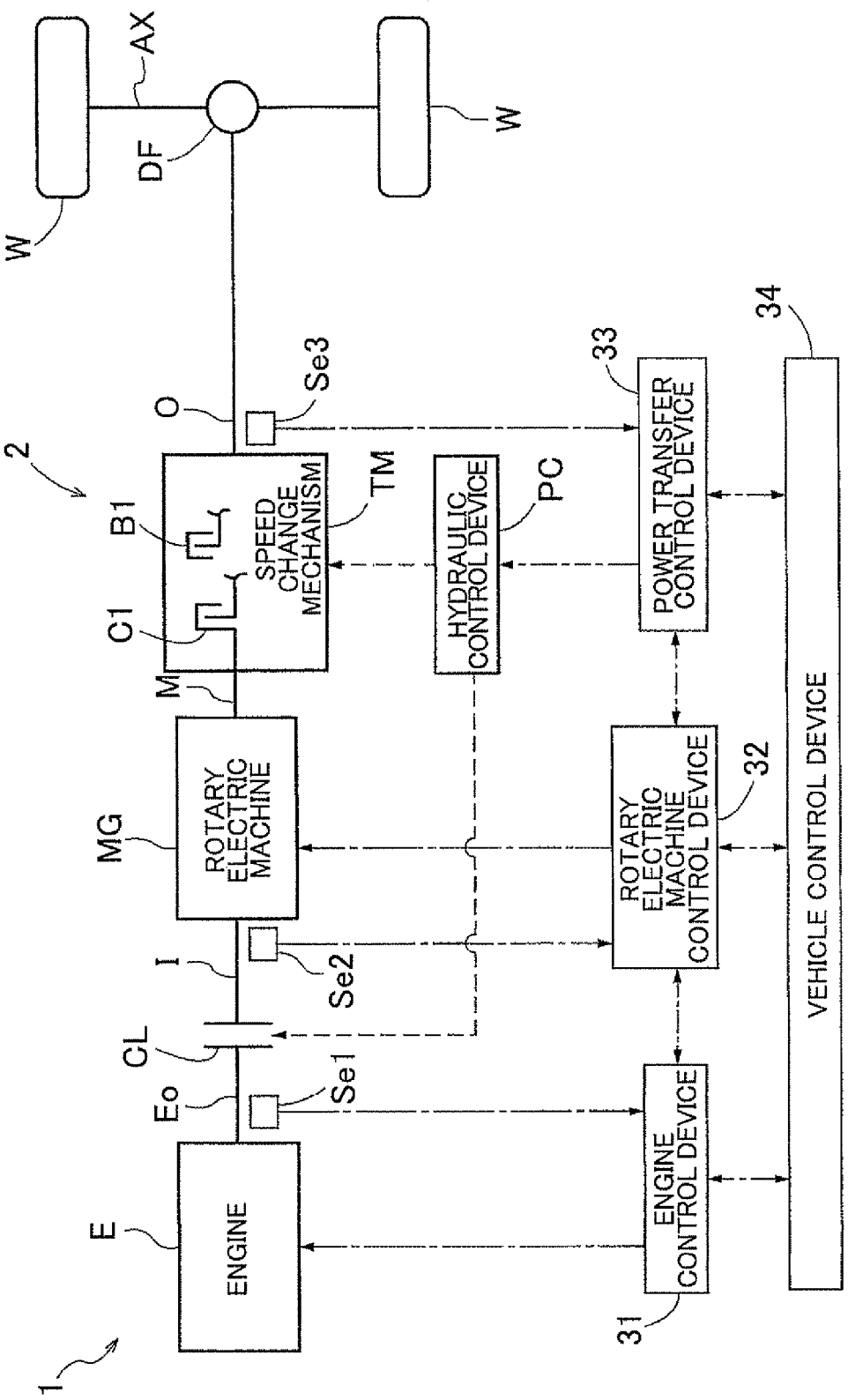
FIG. 1 is a schematic diagram showing a schematic configuration of a power transfer mechanism and a control device according to an embodiment of the present invention.

A rotary electric machine control device 32 according to an embodiment of the present invention will be described with reference to the drawings. FIG. 1 is a schematic diagram showing a schematic configuration of a vehicle drive device 1 according to the embodiment. As shown in the drawing, a vehicle incorporating the vehicle drive device 1 is a hybrid vehicle including an engine E, which is an internal combustion engine, and a rotary electric machine MG each serving as a drive force source for the vehicle. In the drawing, the solid lines each indicate a drive force transfer path, the broken lines each indicate a working oil supply path, and the dash-dotted lines each indicate a signal transfer path. The rotary electric machine MG is included in a power transfer system 2 from a drive force source for the vehicle to wheels W. In the embodiment, the rotary electric machine MG is selectively drivably coupled to the engine E in accordance with the engagement state of an engine separation clutch CL, and drivably coupled to the wheels W via a power output mechanism. In the embodiment, the power output mechanism includes a speed change mechanism TM with a changeable speed ratio Kr drivably coupled to the rotary electric machine MG, and an output shaft O and axles AX that drivably couple the speed change mechanism TM and the wheels W to each other. Therefore, a drive force of the drive force source is transferred to the wheels side with the speed of the drive force changed at the speed ratio Kr of the speed change mechanism TM.

The hybrid vehicle includes an engine control device 31 that controls the engine E, the rotary electric machine control device 32 that controls the rotary electric machine MG, a power transfer control device 33 that controls the speed change mechanism TM and the engine separation clutch CL, and a vehicle control device 34 that integrates these control devices to control the vehicle drive device 1. The engine separation clutch CL corresponds to the "engagement device" according to the present invention. The rotary electric machine control device 32 corresponds to the "control device" according to the present invention.

Figure 2:
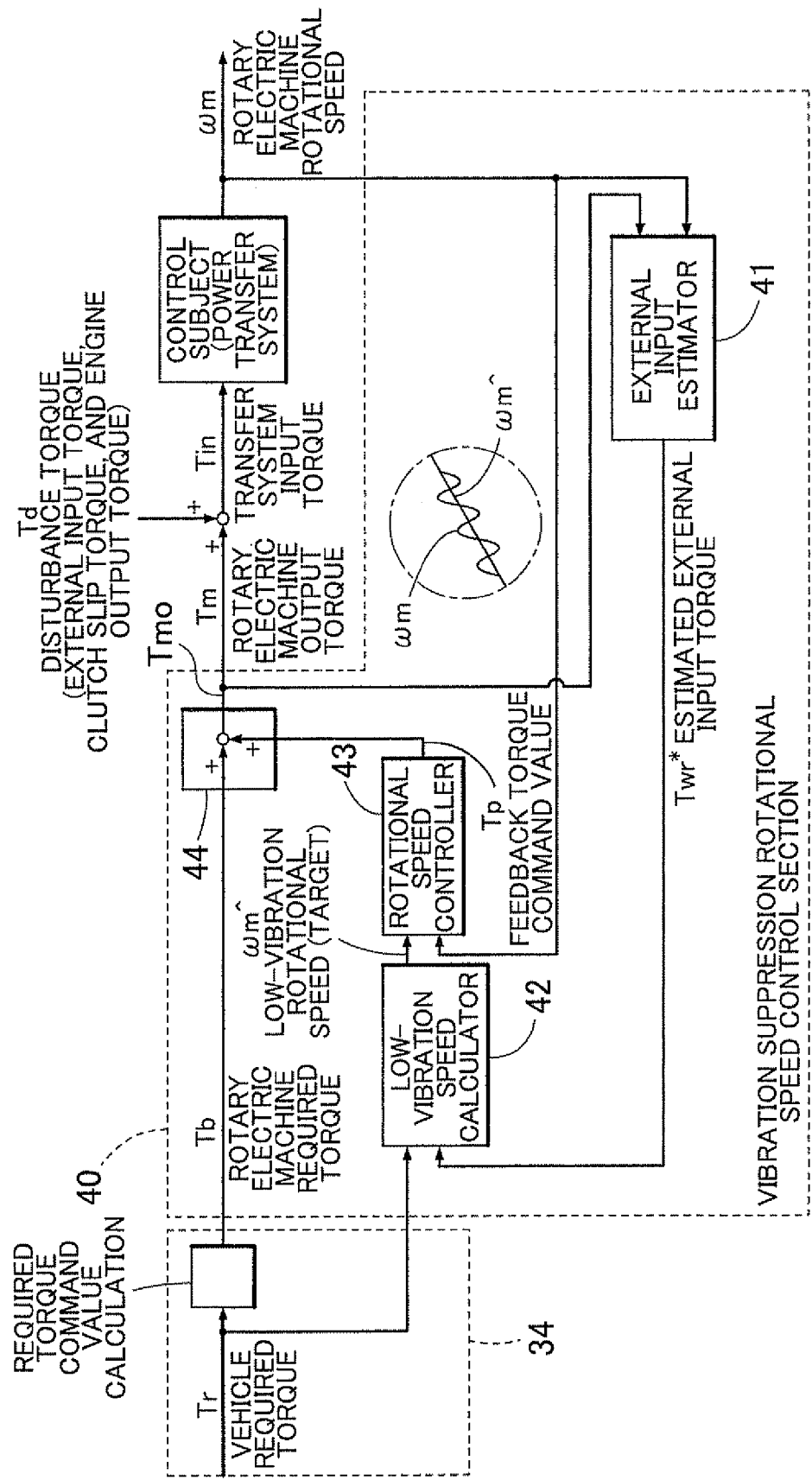
FIG. 2 is a block diagram showing the configuration of the control device according to the embodiment of the present invention.

As shown in FIG. 2, the rotary electric machine control device 32 according to the embodiment configured as described above includes an external input estimator 41 that reduces a vibration component of a rotational speed cam of the power transfer system 2 at the rotational speed cam and estimates transfer system input torque Tin*, which is torque input to the power transfer system 2, on the basis of the rotational speed $\omega m$ of the rotary electric machine MG, and that estimate external input torque Tw, which is input from the wheels W to the power transfer system 2, by subtracting at least output torque Tm of the rotary electric machine MG from the transfer system input torque Tin*. The rotary electric machine control device 32 also includes a low-vibration speed calculator 42 that calculates a low-vibration rotational speed $\omega m\hat{}$, which is a rotational speed obtained by reducing the vibration component of the rotational speed $\omega m$ of the rotary electric machine MG, on the basis of the external input torque Tw and vehicle required torque Tr, which is torque required to drive the wheels W. The rotary electric machine control device 32 is characterized by further including a rotational speed controller 43 that calculates a feedback torque command value Tp that matches the rotational speed $\omega m$ of the rotary electric machine MG with the low-vibration rotational speed $\omega m\hat{}$, and a torque command value calculator 44 that calculates an output torque command value Tmo, which is a command value of the output torque Tm of the rotary electric machine MG, on the basis of the vehicle required torque Tr and the feedback torque command value Tp. The rotary electric machine control device 32 according to the embodiment will be described in detail below.

1. Configuration of Vehicle Drive Device

First, the configuration of the power transfer system 2 of the hybrid vehicle according to the embodiment will be described. As shown in FIG. 1, the hybrid vehicle is a parallel-type hybrid vehicle which includes the engine E and the rotary electric machine MG each serving as a drive force source for the vehicle, and in which the engine E and the rotary electric machine MG are drivably coupled to each other in series. The hybrid vehicle includes the speed change mechanism TM, which transfers rotation of the engine E and the rotary electric machine MG transmitted to an intermediate shaft M to the output shaft O while changing the rotational speed and converting torque.

The engine E is an internal combustion engine driven by combustion of fuel. Various engines known in the art such as a gasoline engine and a diesel engine, for example, may be used as the engine E. In the example, an engine output shaft Eo such as a crankshaft of the engine E is selectively drivably coupled via the engine separation clutch CL to an input shaft I drivably coupled to the rotary electric machine MG. That is, the engine E is selectively drivably coupled to the rotary electric machine MG via the engine separation clutch CL which is a friction engagement element. It is also suitable that the engine output shaft Eo is drivably coupled to an engagement member of the engine separation clutch CL via other members such as a damper.

The rotary electric machine MG includes a stator fixed to a non-rotary member and a rotor supported radially inwardly of the stator so as to be rotatable. The rotor of the rotary electric machine MG is drivably coupled to the intermediate shaft M to rotate together with the intermediate shaft M. That is, in the embodiment, both the engine E and the rotary electric machine. MG are drivably coupled to the intermediate shaft M. The rotary electric machine MG is electrically connected to a battery (not shown) serving as an electricity accumulation device. The rotary electric machine MG can function as a motor (electric motor) that is supplied with electric power to produce power and as a generator (electric generator) that is supplied with power to produce electric power. That is, the rotary electric machine MG performs power running using electric power supplied from the battery, or generates electric power using a rotational drive force transferred from the engine E or the wheels W to accumulate the generated electric power in the battery. The battery is an example of the electricity accumulation device. Other types of electricity accumulation devices such as a capacitor may be used, or a plurality of types of electricity accumulation devices may be used in combination. In the following description, electric power generation performed by the rotary electric machine MG is referred to as "regeneration", and negative torque output from the rotary electric machine MG during electric power generation is referred to as "regenerative torque". In the case where target output torque of the rotary electric machine is negative torque, the rotary electric machine MG outputs regenerative torque while generating electric power using a rotational drive force transferred from the engine E or the wheels W.

The speed change mechanism TM is drivably coupled to the intermediate shaft M, to which the drive force source is drivably coupled. In the embodiment, the speed change mechanism TM is a stepped automatic transmission that provides a plurality of shift speeds with different speed ratios Kr. In order to establish the plurality of shift speeds, the speed change mechanism TM includes a gear mechanism such as a planetary gear mechanism and a plurality of friction engagement elements B1, C1, .... The speed change mechanism TM transfers rotation of the intermediate shaft M to the output shaft O while changing the rotational speed with the speed ratio Kr of each shift speed and converting torque. The torque transferred from the speed change mechanism TM to the output shaft O is distributed and transferred to two, left and right, axles AX via an output differential gear device DF to be transferred to the wheels W drivably coupled to the axles AX. Here, the term "speed ratio Kr" refers to the ratio of the rotational speed of the intermediate shaft M to the rotational speed of the output shaft O in the case where each shift speed is established in the speed change mechanism TM. The term "speed ratio Kr" as used herein refers to a value obtained by dividing the rotational speed of the intermediate shaft M by the rotational speed of the output shaft O. That is, the rotational speed of the output shaft O is obtained by dividing the rotational speed of the intermediate shaft M by the speed ratio Kr. In addition, the torque transferred from the speed change mechanism TM to the output shaft O is obtained by multiplying torque transferred from the intermediate shaft M to the speed change mechanism TM by the speed ratio Kr.

In the example, the engine separation clutch CL and the plurality of friction engagement elements B1, C1, . . . are each an engagement element such as a clutch and a brake formed to include friction members. The friction engagement elements CL, B1, C1, . . . can be continuously controlled such that the transfer torque capacity of the friction engagement element is increased and decreased by controlling the engagement pressure of the friction engagement element by controlling the supplied hydraulic pressure. A wet multi-plate clutch and a wet multi-plate brake, for example, may be suitably used as the friction engagement elements.

A friction engagement element transfers torque between engagement members of the friction engagement element through friction between the engagement members. In the case where there is a difference in rotational speed (slipping) between the engagement members of the friction engagement element, torque (slip torque) corresponding to the magnitude of the transfer torque capacity is transferred from a member with a higher rotational speed to a member with a lower rotational speed through dynamic friction. In the case where there is no difference in rotational speed (slipping) between the engagement members of the friction engagement element, torque up to the magnitude of the transfer torque capacity is transferred between the engagement members of the friction engagement element through static, friction. Here, the term "transfer torque capacity" refers to the magnitude of maximum torque that can be transferred by a friction engagement element through friction. The magnitude of the transfer torque capacity varies in proportion to the engagement pressure of the friction engagement element. The term "engagement pressure" refers to a pressure that presses an input-side engagement member (friction plate) and an output-side engagement member (friction plate) against each other. In the embodiment, the engagement pressure varies in proportion to the magnitude of the supplied hydraulic pressure. That is, in the embodiment, the magnitude of the transfer torque capacity varies in proportion to the magnitude of the hydraulic pressure supplied to the friction engagement element.

Each of the friction engagement elements includes a return spring, and is urged to be disengaged by the reaction force of the spring. When a force produced by the hydraulic pressure supplied to the friction engagement element exceeds the reaction force of the spring, the friction engagement element starts producing the transfer torque capacity to bring the friction engagement element from the disengaged state into the engaged state. The hydraulic pressure at which the transfer torque capacity starts being produced is referred to as a "stroke end pressure". Each of the friction engagement elements is configured such that the transfer torque capacity of the friction engagement element increases in proportion to an increase in supplied hydraulic pressure after the hydraulic pressure exceeds the stroke end pressure.

In the embodiment, the term "engaged state" refers to a state in which a friction engagement element is producing a transfer torque capacity. The term "disengaged state" refers to a state in which a friction engagement element is not producing a transfer torque capacity. The term "slipping engagement state" refers to an engagement state in which there is a difference in rotational speed (slipping) between engagement members of a friction engagement element. The term "direct engagement state" refers to an engagement state in which there is no difference in rotational speed (slipping) between engagement members of a friction engagement element. The term "non-direct engagement state" refers to an engagement state other than the direct engagement state, and includes the disengaged state and the slipping engagement state.

2. Configuration of Hydraulic Control System

Next, a hydraulic control system of the vehicle drive device 1 will be described. The hydraulic control system includes a hydraulic control device PC that adjusts the hydraulic pressure of working oil supplied from a hydraulic pump to a predetermined pressure. Although not described in detail here, the hydraulic control device PC adjusts the degree of opening of one or two or more adjustment valves on the basis of a signal pressure from a linear solenoid valve for hydraulic pressure adjustment to adjust the amount of working oil drained from the adjustment valves, thereby adjusting the hydraulic pressure of the working oil to one or two or more predetermined pressures. After being adjusted to the predetermined pressure, the working oil is supplied to each of the friction engagement elements such as those of the speed change mechanism TM and the engine separation clutch CL at a hydraulic pressure required by the friction engagement element.

3. Configuration of Control Device

Next, the configuration of the control devices 31 to 34 which control the vehicle drive device 1 will be described. The control devices 31 to 34 each include an arithmetic processing unit such as a CPU serving as a core member, a storage device such as a RAM (random access memory) configured to read and write data from and into the arithmetic processing unit and a ROM (read only memory) configured to read data from the arithmetic processing unit, and so forth. The functional sections 41 to 44 of the control devices 31 to 34 are formed by software (a program) stored in the ROM of the control devices or the like, hardware such as a separately provided arithmetic circuit, or a combination of both. The control devices 31 to 34 are configured to communicate with each other, and perform cooperative control while sharing various information such as information detected by sensors and control parameters, thereby implementing functions of the functional sections 41 to 44.

The vehicle drive device 1 includes sensors Se1 to Se3 that output an electrical signal to be input to the control devices 31 to 34. The control devices 31 to 34 calculate information detected by the sensors on the basis of the input electrical signal. The engine rotational speed sensor Se1 is a sensor that detects the rotational speed of the engine output shaft Eo (engine E). The engine control device 31 detects a rotational speed (angular speed) $\omega e$ of the engine E on the basis of a signal input from the engine speed sensor Se1. The input shaft rotational speed sensor Se2 is a sensor that detects the rotational speed of the input shaft I and the intermediate shaft M.

The rotor of the rotary electric machine MG is integrally drivably coupled to the input shaft I and the intermediate shaft M. Thus, the rotary electric machine control device 32 detects the rotational speed (angular speed) ωe of the rotary electric machine MG and the rotational speed of the input shaft I and the intermediate shaft M on the basis of a signal input from the input shaft rotational speed sensor Se2. The output shaft rotational speed sensor Se3 is a sensor attached to the output shaft O in the vicinity of the speed change mechanism TM to detect the rotational speed of the output shaft O in the vicinity of the speed change mechanism TM. The power transfer control device 33 detects a rotational speed (angular speed) ωo of the output shaft O in the vicinity of the speed change mechanism TM on the basis of a signal input from the output shaft rotational speed sensor Se3. The rotational speed of the output shaft O is proportional to the vehicle speed. Therefore, the power transfer control device 33 calculates the vehicle speed on the basis of the signal input from the output shaft rotational speed sensor Se3. The rotational speed ωo of the output shaft O corresponds to the "output rotational speed" according to the present invention.

3-1. Vehicle Control Device

The vehicle control device 34 includes functional sections that control integration of various torque control performed on the engine E, the rotary electric machine MG, the speed change mechanism TM, the engine separation clutch CL, and so forth, engagement control for the friction engagement elements, and so forth over the entire vehicle.

The vehicle control device 34 calculates the vehicle required torque Tr, which is torque required to drive the wheels W and which is a target drive force to be transferred from the intermediate shaft M side to the output shaft O side, and determines the drive mode of the engine E and the rotary electric machine MG, in accordance with the accelerator operation amount, the vehicle speed, the charge amount of the battery, and so forth. The vehicle control device 34 is a functional section that calculates engine required torque, which is output torque required for the engine E, rotary electric machine required torque Tb, which is output torque required for the rotary electric machine MG, and a target transfer torque capacity of the engine separation clutch CL to provide the calculated values to the other control devices 31 to 33 for integration control.

Figure 3A:
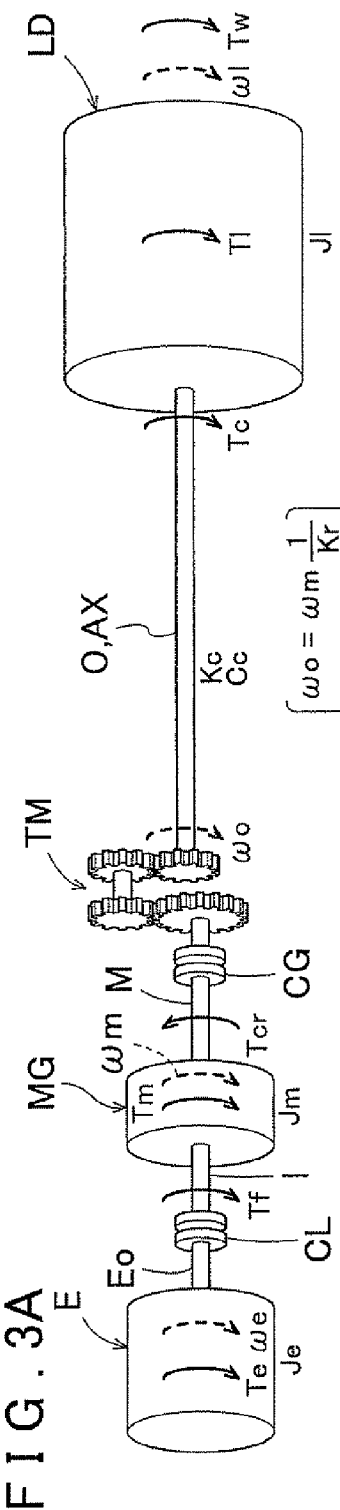
Figure 3B:
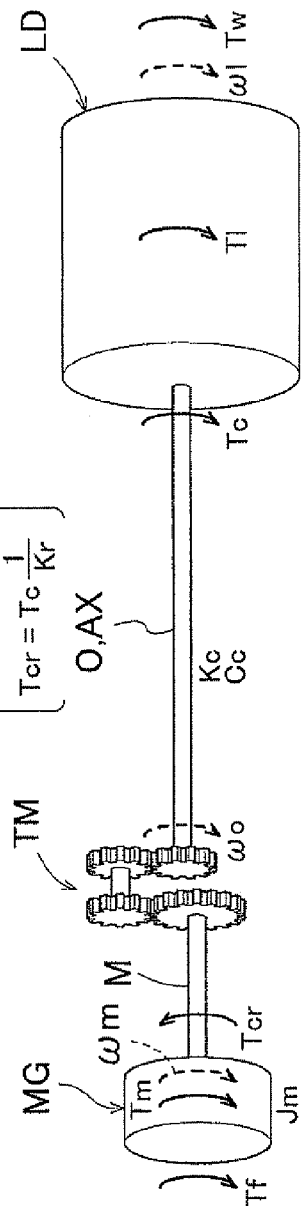

In the embodiment, in the case where the engine separation clutch CL is in the non-direct engagement state as shown in FIG. 3B, the vehicle control device 34 determines the rotary electric machine required torque Tb and the target transfer torque capacity of the engine separation clutch CL such that torque obtained by totaling the output torque Tm of the rotary electric machine MG and slip torque Tf of the engine separation clutch CL matches the vehicle required torque Tr. In the example, torque obtained by subtracting estimated slip torque Tf* from the vehicle required torque Tr is determined as the rotary electric machine required torque Tb (see FIG. 7). The non-direct engagement state includes the disengaged state of the engine separation clutch CL, in which the slip torque Tf is zero.

Figure 3C:
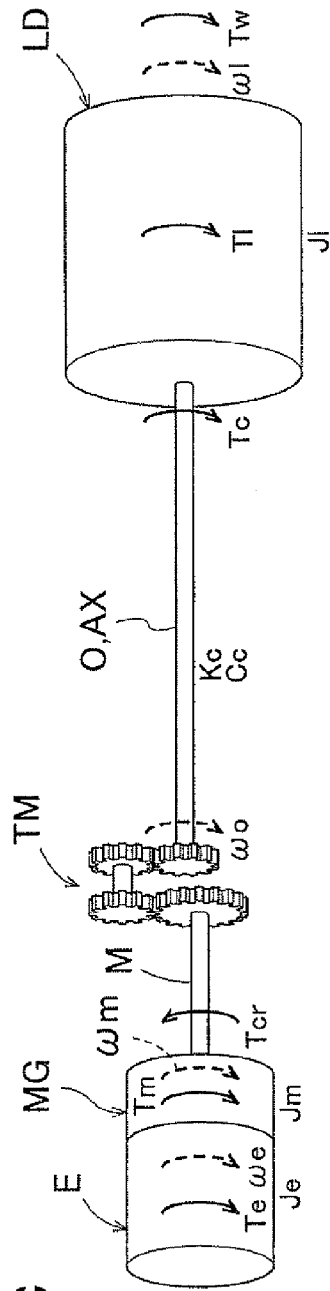

In the case where the engine separation clutch CL is in the direct engagement state as shown in FIG. 3C, on the other hand, the vehicle control device 34 determines the rotary electric machine required torque Tb and the engine required torque such that torque obtained by totaling the output torque Tm of the rotary electric machine MG and output torque Te of the engine E matches the vehicle required torque Tr. In the example, torque obtained by subtracting estimated engine output torque Te* from the vehicle required torque Tr is determined as the rotary electric machine required torque Tb.

The vehicle control device 34 determines the drive mode of the drive force source on the basis of the accelerator operation amount, the vehicle speed, the charge amount of the battery, and so forth. Here, the charge amount of the battery is detected by a battery state detection sensor. In the embodiment, examples of the drive mode include an electric drive mode in which only the rotary electric machine MG is used as the drive force source, a parallel mode in which at least the engine E is used as the drive force source, an engine power generation mode in which a rotational drive force of the engine E is used for regenerative power generation performed by the rotary electric machine MG, a regenerative power generation mode in which a rotational drive force transferred from the wheels is used for regenerative power generation performed by the rotary electric machine MG, and an engine start mode in which a rotational drive force of the rotary electric machine MG is used to start the engine E.

Here, the engine separation clutch CL is brought into the direct engagement state in the drive modes including the parallel mode, the engine power generation mode, and the engine start mode. In the engine start mode, as described in relation to an example to be described later, the engine separation clutch CL is brought into the slipping engagement state while the rotary electric machine MG is rotating so that positive torque corresponding to the magnitude of the transfer torque capacity is transferred from the engine separation clutch CL to the engine E side. As a reaction force, negative torque (slip torque) Tf corresponding to the magnitude of the transfer torque capacity is transferred from the engine separation clutch CL to the rotary electric machine MG side.

3-2. Engine Control Device

The engine control device 31 includes a functional section that controls an operation of the engine E. In the embodiment, in the case where a command for the engine required torque is provided from the vehicle control device 34, the engine control device 31 performs torque control in which an output torque command value is set to the engine required torque according to the command provided from the vehicle control device 34, and in which the engine E is controlled so as to output the output torque Te corresponding to the output torque command value. The engine control device 31 is also configured to estimate the output torque Te of the engine E, and to transfer the estimated torque to other control devices as the estimated engine output torque Te*. The engine control device 31 may be adapted to calculate the estimated engine output torque Te* on the basis of the output torque command value, and to transfer the calculated estimated engine output torque Te*.

3-3. Power Transfer Control Device

The power transfer control device 33 includes a functional section that controls the speed change mechanism TM and the engine separation clutch CL. The power transfer control device 33 receives information detected by the sensors such as the output shaft rotational speed sensor Se3.

3-3-1. Control of Speed Change Mechanism

The power transfer control device 33 controls establishment of a shift speed in the speed change mechanism TM. In the embodiment, the power transfer control device 33 determines a target shift speed for the speed change mechanism TM on the basis of information detected by the sensors such as the vehicle speed, the acceleration operation amount, and the shift position. Then, the power transfer control device 33 controls the hydraulic pressure to be supplied to the friction engagement elements C1, B1, . . . provided in the speed change mechanism TM via the hydraulic control device PC to engage or disengage the friction engagement elements in order to establish the target shift speed in the speed change mechanism TM. Specifically, the power transfer control device 33 provides the hydraulic control device PC with a command for a target hydraulic pressure (command pressure) for the friction engagement elements B1, C1, . . . and the hydraulic control device PC supplies the friction engagement elements with the target hydraulic pressure (command pressure) according to the command.

During switching between shift speeds (during shifting), the power transfer control device 33 temporarily controls a friction engagement element to be engaged or disengaged (speed change engagement element) into the slipping engagement state. Also during the shifting, the engagement pressure for the speed change engagement element is controlled such that torque transferred from the intermediate shaft M side to the output shaft O side becomes the vehicle required torque Tr because of the slip torque of the speed change engagement element. During the shifting, in addition, the intermediate shaft M and the output shaft O are brought into a non-directly coupled state, in which no torsional torque due to elastic (torsional) vibration is transferred but torque due to dynamic friction is transferred, or no torque is transferred, between the intermediate shaft M and the output shaft O.

3-3-2. Control of Engine Separation Clutch

The power transfer control device 33 engages and disengages the engine separation clutch CL. In the embodiment, the power transfer control device 33 controls the hydraulic pressure to be supplied to the engine separation clutch CL via the hydraulic control device PC such that the transfer torque capacity of the engine separation clutch CL matches the target transfer torque capacity according to the command provided from the vehicle control device 34. Specifically, the power transfer control device 33 provides the hydraulic control device PC with a command for a target hydraulic pressure (command pressure) set on the basis of the target transfer torque capacity, and the hydraulic control device PC supplies the engine separation clutch CL with the target hydraulic pressure (command pressure) according to the command.

The power transfer control device 33 estimates the transfer torque capacity of the engine separation clutch CL. In the case where the engine separation clutch CL is in the slipping engagement state, the power transfer control device 33 estimates the slip torque Tf, which is transferred from the engine separation clutch CL to the rotary electric machine MG side through dynamic friction, on the basis of the estimated transfer torque capacity. The power transfer control device 33 is configured to transfer the estimated slip torque Tf to other control devices as the estimated slip torque Tf*.

In the embodiment, the power transfer control device 33 estimates the transfer torque capacity by performing a response delay process, in which a response delay of a hydraulic pressure supply system is simulated, on the target transfer torque capacity or the target hydraulic pressure (command pressure). Then, the power transfer control device 33 determines the direction of torque transfer on the basis of the relationship between the rotational speeds of the engagement members of the engine separation clutch CL, multiplies the estimated transfer torque capacity by a positive or negative sign (+1 or −1), and sets the estimated slip torque Tf* to the resulting product. For example, in the case where the rotational speed ωm of the rotary electric machine MG is higher than a rotational speed ωe of the engine E, the estimated slip torque Tf* is set to a value obtained by multiplying the estimated transfer torque capacity by a negative sign (−1). In the case where the rotational speed ωm of the rotary electric machine MG is lower than the rotational speed ωe of the engine E, the estimated slip torque Tf* is set to a value obtained by multiplying the estimated transfer torque capacity by a positive sign (+1). In the case where the engine separation clutch CL is in the direct engagement state or in the disengaged state, the estimated slip torque Tf* is set to zero.

3-4. Rotary Electric Machine Control Device

The rotary electric machine control device 32 includes a functional section that controls an operation of the rotary electric machine MG. In the embodiment, the rotary electric machine control device 32 sets the output torque command value Tmo at least on the basis of the rotary electric machine required torque Tb according to the command provided from the vehicle control device 34, and controls the rotary electric machine MG so as to output the output torque Tm corresponding to the torque command value. In the embodiment, in the case where the control mode of the rotary electric machine MG is set to a torque control mode, the output torque command value Tmo is set to the rotary electric machine required torque Tb. In the case where the control mode of the rotary electric machine MG is set to a rotational speed control mode, the output torque command value Tmo is set to torque obtained by adding the feedback torque command value Tp to be described later to the rotary electric machine required torque Tb. In the embodiment, the rotary electric machine control device 32 includes a vibration suppression rotational speed control section 40 (see FIG. 2) that calculates the feedback torque command value Tp.

3-4-1. Vibration Suppression Rotational Speed Control Section

As shown in FIG. 2, the vibration suppression rotational speed control section 40 is a functional section that executes vibration suppression rotational speed control in which the target rotational speed is set to the low-vibration rotational speed ωm^, which is a rotational speed obtained by reducing the vibration component of the rotational speed ωm of the rotary electric machine MG produced by shaft torsional vibration of the power transfer system 2 or the like, and in which a feedback torque command value Tp that matches the rotational speed ωm of the rotary electric machine MG with the target rotational speed is calculated. The vibration suppression rotational speed control acts to reduce the vibration component of the rotational speed ωm of the rotary electric machine MG, that is, to suppress vibration of the rotational speed ωm of the rotary electric machine MG, and acts to match the center of vibration of the rotational speed ωm of the rotary electric machine MG with the low-vibration rotational speed ωm^.

In calculating the rotational speed obtained by reducing the vibration component of the rotational speed ωm of the rotary electric machine MG, the vibration suppression rotational speed control section 40 does not perform the calculation in a feedback manner, such as by simply performing a filtering process on the rotational speed ωm of the rotary electric machine MG which may cause a response delay. Rather, the vibration suppression rotational speed control section 40 performs the calculation in a feedforward manner on the basis of the vehicle required torque Tr, which is torque required to drive the wheels W, and an estimated value of the external input torque Tw, which is input from the wheels W to the power transfer system 2, so as not to cause a response delay. That is, the vibration suppression rotational speed control is executed using the low-vibration rotational speed ωm^ calculated in a feedforward manner so that no response delay will be caused in the behavior of the rotational speed ωm of the rotary electric machine MG.

In order to estimate the rotational speed ωm of the rotary electric machine MG in a feedforward manner, it is not sufficient to perform the estimation only on the basis of the output torque Tm of the rotary electric machine MG, the output torque Te of the engine E, the slip torque Tf, and so forth which are output from the rotary electric machine MG side to the wheels W side, and it is necessary to perform the estimation additionally on the basis of the external input torque Tw, such as running resistance torque and brake torque, which is transferred from the wheels W side to the rotary electric machine MG side. Here, the torque output from the rotary electric machine MG side to the wheels W side is controlled on the basis of the vehicle required torque Tr calculated by the control device, and therefore can be grasped. However, the external input torque Tw, which is input from the wheels W to the power transfer system 2, serves as a disturbance to the control system, and therefore needs to be estimated. Thus, in estimating the external input torque Tw from the rotational speed corn of the rotary electric machine MG, the vibration suppression rotational speed control section 40 performs the estimation process after reducing the vibration component of the rotational speed ωm of the power transfer system 2 so that the estimated external input torque Tw will not be affected by the vibration component of the rotational speed corn of the power transfer system 2.

In order to execute the vibration suppression rotational speed control, as shown in FIG. 2, the vibration suppression rotational speed control section 40 includes the external input estimator 41, the low-vibration speed calculator 42, the rotational speed controller 43, and the torque command value calculator 44. The external input estimator 41 reduces the vibration component of the rotational speed corn of the power transfer system 2 at the rotational speed ωm and estimates the transfer system input torque Tin*, which is torque input to the power transfer system 2, on the basis of the rotational speed corn of the rotary electric machine MG, and estimates the external input torque Tw input from the wheels W to the power transfer system 2 by subtracting at least the output torque Tm of the rotary electric machine MG from the transfer system input torque Tin*. The low-vibration speed calculator 42 calculates the low-vibration rotational speed ωm^, which is a rotational speed obtained by reducing the vibration component of the rotational speed tem of the rotary electric machine MG, on the basis of the external input torque Tw and the vehicle required torque Tr, which is torque required to drive the wheels W. The rotational speed controller 43 calculates the feedback torque command value Tp which matches the rotational speed torn of the rotary electric machine MG with the low-vibration rotational speed ωm^. The feedback torque command value Tp corresponds to the "feedback command torque" according to the present invention. The torque command value calculator 44 calculates the output torque command value Tmo, which is a command value of the output torque Tm of the rotary electric machine MG, on the basis of the vehicle required torque Tr and the feedback torque command value Tp. Processes of the vibration suppression rotational speed control executed by the vibration suppression rotational speed control section 40 will be described in detail below.

3-4-2. Modeling into Shaft Torsional Vibration System

First, a model of a control subject serving as a base of control design in the vibration suppression rotational speed control will be described. FIG. 3A shows a model of the power transfer system 2 serving as the control subject. Here, the power transfer system 2 is modeled into a shaft torsional vibration system. The rotary electric machine MG is selectively drivably coupled to the engine B in accordance with the engagement state of the engine separation clutch CL, and drivably coupled to the vehicle serving as a load via the speed change mechanism TM, the output shaft O, and the axles AX. In the case where the speed change engagement element, which is a friction engagement element that establishes a shift speed, among the plurality of friction engagement elements B1, C1, . . . of the speed change mechanism TM, is in the direct engagement state, the speed change mechanism TM transfers rotation between the intermediate shaft M and the output shaft O while changing the rotational speed at the speed ratio Kr and converting torque. In the following description, the output shaft O and the axles AX are collectively referred to as an "output shaft". In the following description, unless otherwise noted, the speed change engagement element is in the direct engagement state. The speed change engagement element may be a speed change clutch CG, for example, and illustrated in the form of the speed change clutch CG in FIGS. 3 and 4.

The engine E, the rotary electric machine MG, and a load LD (vehicle) are modeled as rigid bodies having moments of inertia Je, Jm, and J1, respectively. The rigid bodies are drivably coupled to each other through shafts including the engine output shaft Eo, the input shaft I, the intermediate shaft M, and the output shaft. Therefore, the power transfer system 2 can be modeled into a two-inertia system including the rotary electric machine MG and the load (vehicle) when the engine separation clutch CL is in the non-direct engagement state, and can be modeled into a three-inertia system including the engine E, the rotary electric machine MG and the load (vehicle) when the engine separation clutch CL is in the direct engagement state.

Here, Te is output torque output from the engine E, ωe is the rotational speed (angular speed) of the engine E, and Tf is slip torque transferred from the engine separation clutch CL to the rotary electric machine MG side in the slipping engagement state. Tm is output torque output from the rotary electric machine MG, ωm is the rotational speed (angular speed) of the rotary electric machine MG, and Ter is torsional reaction torque of the output shaft transferred to the rotary electric machine MG via the speed change mechanism TM. ωo is the rotational speed (angular speed) of the output shaft at an end portion on the speed change mechanism TM side.

Meanwhile, Tc is torsional torque of the output shaft to be transferred to the load LD (vehicle), Tw is running resistance torque, such as slope resistance, air resistance, and tire friction resistance, brake torque, and so forth input from the wheels W to the power transfer system 2, and ω1 is the rotational speed (angular speed) of the output shaft at an end portion on the load side, which corresponds to the rotational speed (angular speed) of the load (wheels). In the case where the speed change engagement element is in the direct engagement state in the speed change mechanism TM, a rotational speed obtained by dividing the rotational speed corn of the rotary electric machine MG by the speed ratio Kr corresponds to the rotational speed ωo of the output shaft at the end portion on the speed change mechanism TM side, and torque obtained by dividing torsional torque Tc of the output shaft to be transferred to the load by the speed ratio Kr corresponds to the torsional reaction torque Ter of the output shaft to be transferred to the rotary electric machine MG. Kc is the torsional spring constant of the output shaft, and Cc is the viscous friction coefficient of the output shaft.

3-4-3. Two-inertia Model

First, a case where the speed change engagement element of the speed change mechanism TM is in the direct engagement state will be described. In the embodiment, the engine output shaft Eo, the input shaft I, and the intermediate shaft M have a large spring constant and produce small torsion compared to the output shaft, and therefore are simplified as rigid bodies to facilitate analysis and design. Therefore, when the engine separation clutch CL is in the direct engagement state as shown in FIG. 3C, the engine E and the rotary electric machine MG are treated as a single rigid body for simplification from a three-inertia system into a two-inertia system.

As shown in FIGS. 3B and 3C, the moment of inertia on the rotary electric machine MG side is switched between Jm and Jm+Je in accordance with whether the engine separation clutch CL is in the non-direct engagement state or in the direct engagement state. Therefore, as described later, the resonance frequency ωa, which is the natural vibration frequency of the shaft torsional vibration system (power transfer system 2) varies significantly in accordance with the engagement state of the engine separation clutch CL. Further, variations in speed ratio Kr also cause variations in transfer of rotational speed and torque between the rotary electric machine MG side and the load LD (vehicle) side. Therefore, the resonance frequency ωa and so forth vary significantly in each of the non-direct engagement state and the direct engagement state. Thus, as described later, the control constants of the vibration suppression rotational speed control section 40 are changed in accordance with the engagement state of the engine separation clutch and the speed ratio Kr to adapt to variations in characteristics of the shaft torsional vibration system.

In the case where the engine separation clutch CL is in the non-direct engagement state in which slipping occurs as shown in FIG. 3B, the slip torque Tf is input from the engine separation clutch CL to the rotary electric machine MG through dynamic friction. Therefore, when the transfer torque capacity of the engine separation clutch CL is increased from zero to bring the engine separation clutch CL from the disengaged state into the slipping engagement state, torque input to the shaft torsional vibration system varies by an amount corresponding to the slip torque Tf to serve as a disturbance to the shaft torsional vibration system, which may cause shaft torsional vibration.

In the case where the engine separation clutch CL is in the direct engagement state as shown in FIG. 3C, meanwhile, the output torque Te of the engine E, rather than the slip torque Tf, is input to the rotary electric machine MG side. Therefore, torque acting on the rotary electric machine MG side is switched between the slip torque Tf and the output torque Te of the engine E at the moment when the engagement state is switched between the non-direct engagement state and the direct engagement state. Therefore, in the case where the slip torque If and the output torque Te of the engine E are different in magnitude from each other, stepwise torque variations are input to the shaft torsional vibration system. The stepwise torque variations serve as a disturbance to the shaft torsional vibration system to cause shaft torsional vibration. Thus, when the transfer torque capacity or the engagement state of the engine separation clutch is varied, the vibration suppression rotational speed control may be executed to suppress shaft torsional vibration caused by such variations.

Figure 5:
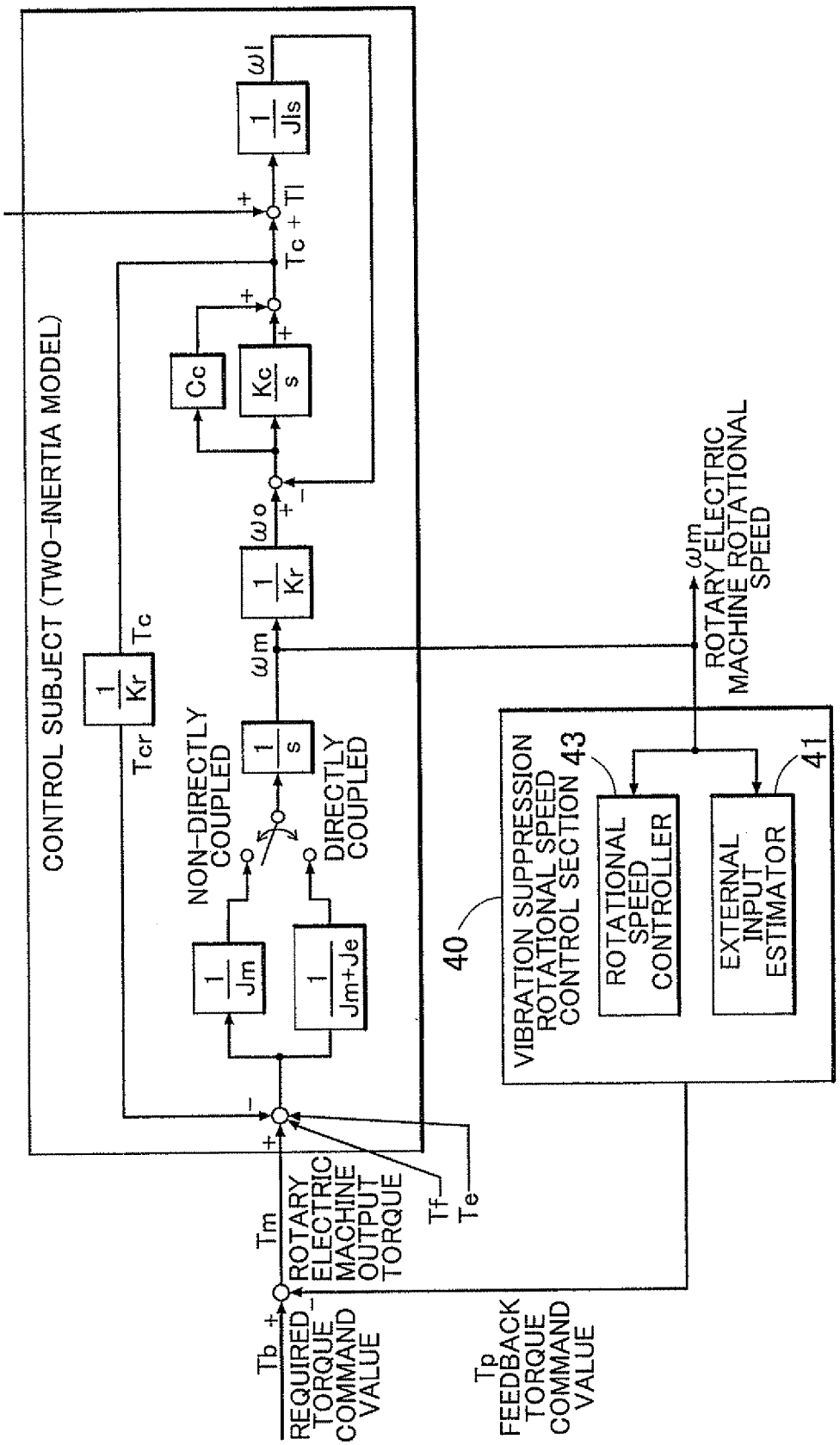
FIG. 5 is a block line diagram of the power transfer system and the control device according to the embodiment of the present invention.

FIG. 5 is a block line diagram of the two-inertia model of FIGS. 3B and 3C. Here, s indicates a Laplace operator. As shown in the drawing, the output torque Tm of the rotary electric machine MG is used as a control input to the shaft torsional vibration system, and the rotational speed ωm of the rotary electric machine MG can be observed. The transfer system input torque Tin (see FIG. 7), which is torque input to the shaft torsional vibration system (power transfer system 2), includes the output torque Te of the engine E, the slip torque If of the engine separation clutch CL, and the external input torque Tw in addition to the output torque Tm of the rotary electric machine MG.

Torque obtained by subtracting the torsional reaction torque Ter of the output shaft from the output torque Tm of the rotary electric machine MG and adding the slip torque Tf or the engine output torque Te to the resulting torque acts on the rotary electric machine MG side. A moment of inertia Jd on the rotary electric machine MG side is switched between the moment of inertia Jm of the rotary electric machine MG only, which is used when the engine separation clutch CL is in the non-direct engagement state, and a value (Jm+Je) obtained by adding the moment of inertia Jm of the rotary electric machine MG and the moment of inertia Je of the engine E, which is used when the engine separation clutch CL is in the direct engagement state. A value obtained by dividing the torque acting on the rotary electric machine MG side by the moment of inertia Jd is used as the rotational acceleration (angular acceleration) of the rotary electric machine MG. Then, a value obtained by integrating (1/s) the rotational acceleration of the rotary electric machine MG is used as the rotational speed (angular speed) ωm of the rotary electric machine MG.

A value obtained by dividing the rotational speed ωm of the rotary electric machine MG by the speed ratio Kr is used as the rotational speed ωo of the output shaft at the end portion on the speed change mechanism TM side. A value obtained by subtracting the rotational speed ωl of the output shaft at the end portion on the load LD (vehicle) side from the rotational speed ωo of the output shaft at the end portion on the speed change mechanism TM side is used as a differential rotational speed between both the end portions. A value obtained by multiplying the differential rotational speed by the viscous friction coefficient Cc of the output shaft is used as damping torque. A value obtained by multiplying a torsional angle, which is a value obtained by integrating (1/s) the differential rotational speed, by the torsional spring constant Kc is used as elastic torque. Then, torque obtained by totaling the damping torque and the elastic torque is used as the torsional torque Tc of the output shaft. A value obtained by adding the external input torque Tw to the torsional torque Tc is used as the torque Tl acting on the load LD (vehicle). A value obtained by dividing the torque Tl acting on the load by the moment of inertia Jl of the load and integrating (1/s) the quotient is used as the rotational speed (angular speed) ωl of the load (wheels).

Here, the output torque Tm of the rotary electric machine MG is used as a control input to the two-inertia model serving as the control subject, and the rotational speed ωm of the rotary electric machine MG is used as a variable that can be observed for the vibration suppression rotational speed control. As described in detail later, the vibration suppression rotational speed control section 40 executes the vibration suppression rotational speed control to output the vibration suppression torque command value Tp through feedback control performed on the basis of the rotational speed ωm of the rotary electric machine MG.

Figure 7:
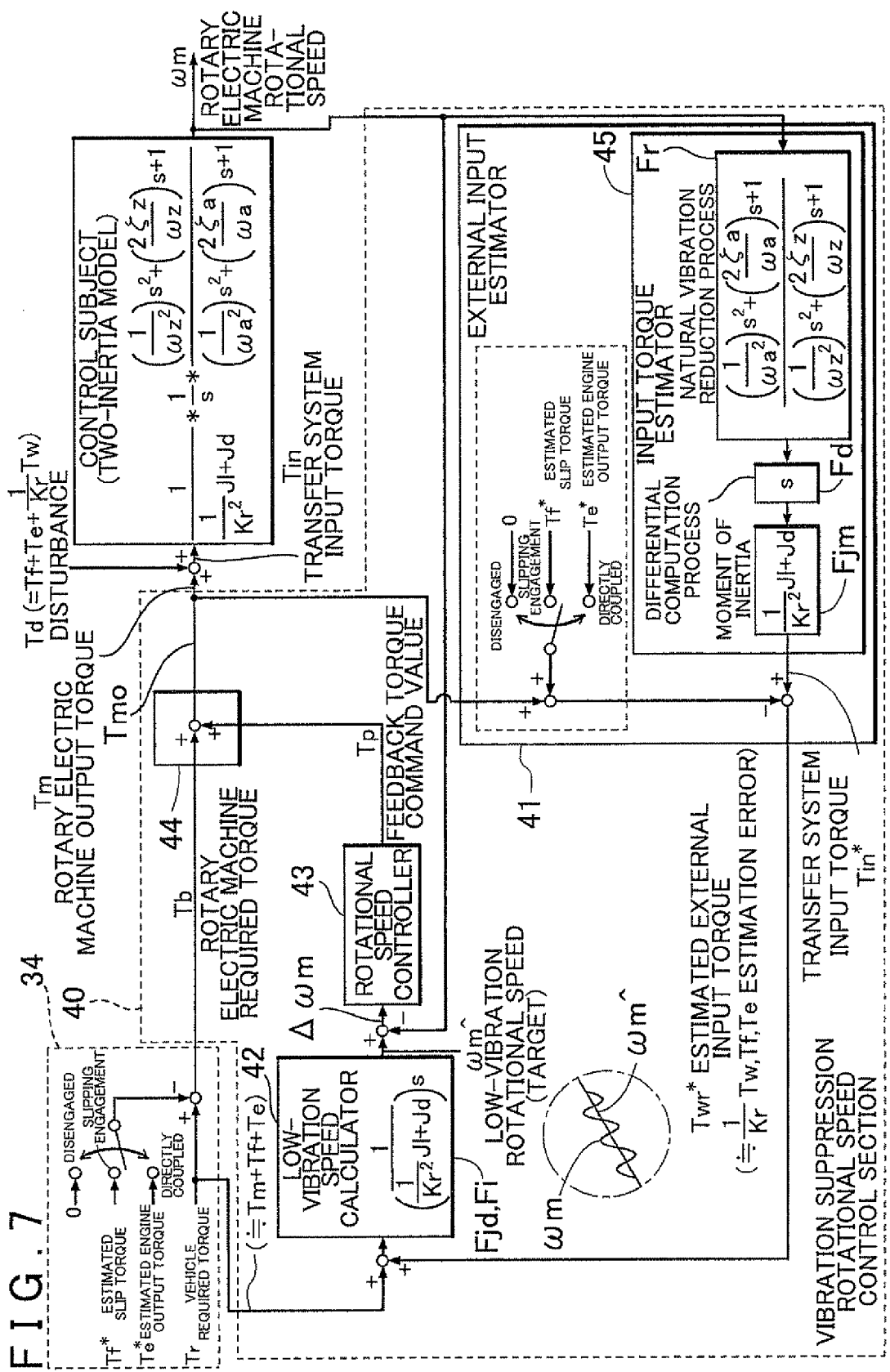
FIG. 7 is a block diagram showing the configuration of the control device according to the embodiment of the present invention.

3-4-4. Transfer Function of Two-inertia Model 3-4-4-1. Function of Transfer from Output Torque of Rotary Electric Machine to Rotational Speed of Rotary Electric Machine Next, as seen from the block line diagram of the two-inertia model in FIG. 5, a function of transfer P(s) of the control subject from the output torque Tm of the rotary electric machine MG to the rotational speed ωm of the rotary electric machine MG is as indicated by the following formula and as shown in FIG. 7. The transfer function P(s) is also used as the function of transfer from the output torque Te of the engine E or the slip torque Tf to the rotational speed ωm of the rotary electric machine MG

[Formula 1]

$$\omega m(s) = P(s)(Tm(s) + Te(s) + Tf(s)) \quad (1)$$

$$P(s) = \cfrac{1}{\cfrac{1}{Kr^2}Jl + Jd} \cdot \cfrac{1}{s} \cdot \cfrac{(1/\omega z^2)s^2 + 2(\zeta z/\omega z)s + 1}{(1/\omega a^2)s^2 + 2(\zeta a/\omega a)s + 1}$$

Here, $\omega a$ is the resonance frequency, $\zeta a$ is the resonance point damping factor, $\omega z$ is the anti-resonance frequency, and $\zeta z$ is the anti-resonance point damping factor. These are represented by the following formula using the torsional spring constant Kc and the viscous friction coefficient Cc of the output shaft, the moment of inertia J1 of the load LD (vehicle), the moment of inertia Jd on the rotary electric machine MG side, and the speed ratio Kr. The resonance frequency $\omega a$ corresponds to the natural vibration frequency of the power transfer system 2 according to the present invention.

As described above, the moment of inertia Jd on the rotary electric machine MG side varies in accordance with whether in the non-direct engagement state or in the direct engagement state. In addition, the speed ratio Kr varies in accordance with the shift speed established in the speed change mechanism TM. Therefore, as seen from the following formula, the resonance frequency $\omega a$ varies in accordance with whether in the non-direct engagement state or in the direct engagement state, and in accordance with the speed ratio Kr.

[Formula 2]

$$\omega a = \sqrt{Kc\left(\frac{1}{Jl} + \frac{1}{Kr^2 Jd}\right)} \quad (2)$$

$$\zeta a = \frac{Cc\omega a}{2Kc}$$

$$\omega z = \sqrt{\frac{Kc}{Jl}}$$

$$\zeta z = \frac{Cc\omega z}{2Kc}$$

(a) Indirect Engagement State $Jd = Jm$ (b) Direct Engagement State $Jd = Jm + J1$ It is found from the formula (1) that the rotational speed $\omega m$ of the rotary electric machine MG is obtained by dividing the output torque Tm of the rotary electric machine MG by the moment of inertia $(J1/Kr^2 + Jd)$ of the entire shaft torsional vibration system (power transfer system) to derive a rotational acceleration, integrating (1/s) the resulting rotational acceleration to derive a rotational speed in a steady state, and having a two-inertia vibration component carried on the resulting rotational speed. The moment of inertia $(J1/Kr^2 + Jd)$ is obtained based on the rotary electric machine MG side with respect to the speed change mechanism TM.

It is found from the formula (2) that when the direct engagement state is established, the resonance frequency $\omega a$ of the two-inertia vibration component decreases because the moment of inertia Jd on the rotary electric machine MG side increases by an amount corresponding to the moment of inertia Je of the engine E. It is also found that the resonance point damping factor $\zeta a$ is proportional to the resonance frequency $\omega a$ and thus decreases when the direct engagement state is established. Meanwhile, it is found that the anti-resonance frequency $\omega z$ is relevant to only the moment of inertia J1 of the load LD (vehicle) and thus does not vary in accordance with the engagement state. It is also found that the anti-resonance point damping factor $\zeta z$ is proportional to the anti-resonance frequency $\omega z$ and thus does not vary when the direct engagement state is established. Therefore, it is found from the formulas (1) and (2) that the resonance frequency $\omega a$ decreases and the damping factor $\zeta a$ of resonant vibration decreases when the engine separation clutch CL is brought from the non-direct engagement state into the direct engagement state.

Figure 11:
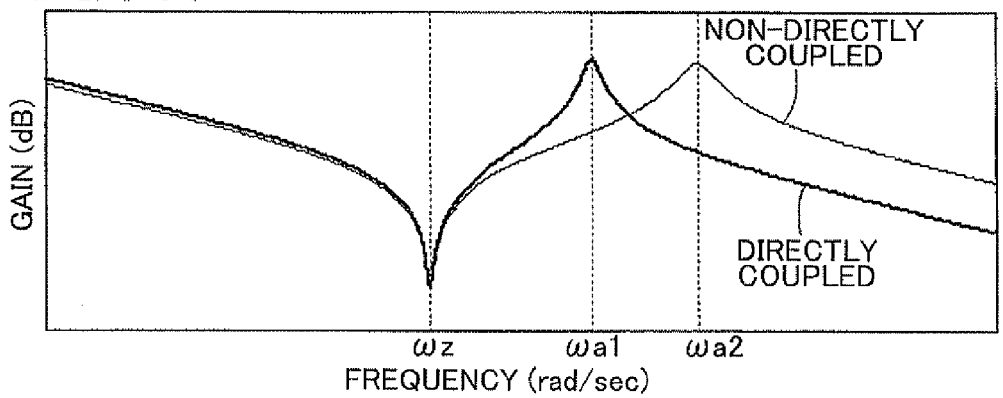
FIG. 11 is a Bode diagram illustrating a process performed by the control device according to the embodiment of the present invention.

FIG. 11 shows an exemplary Bode diagram of the transfer function P(s) of the control subject. It is found also from the Bode diagram that the resonance frequency $\omega a$ decreases significantly but the anti-resonance frequency $\omega z$ does not vary when a shift is made from the non-direct engagement state to the direct engagement state. Thus, it is necessary to change the control constants of the vibration suppression rotational speed control section 40 in accordance with the engagement state so as to adapt to the resonance frequency $\omega a$ which varies in accordance with whether in the direct engagement state or in the non-direct engagement state.

Figure 12A:
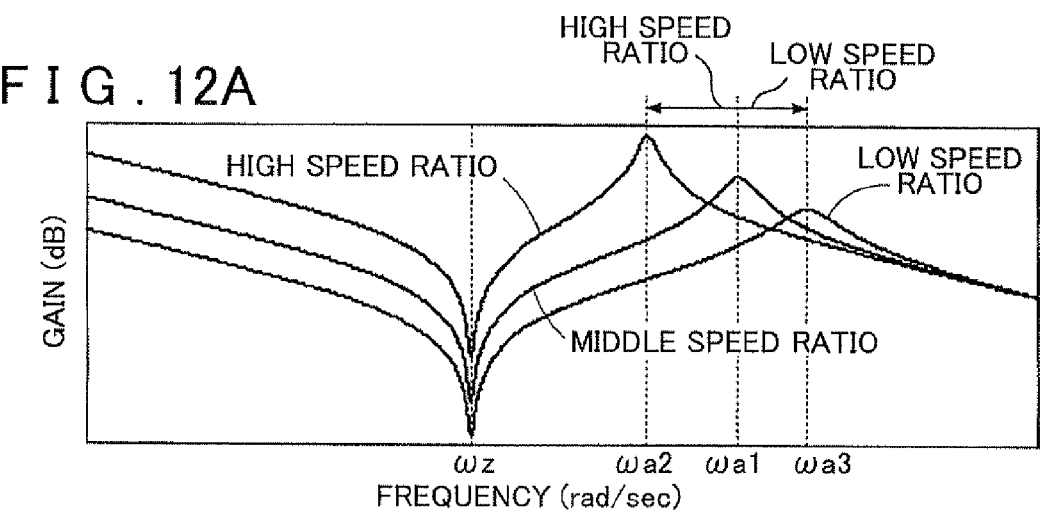
FIGS. 12A and 12B are Bode diagrams illustrating a process performed by the control device according to the embodiment of the present invention.
Figure 12B:
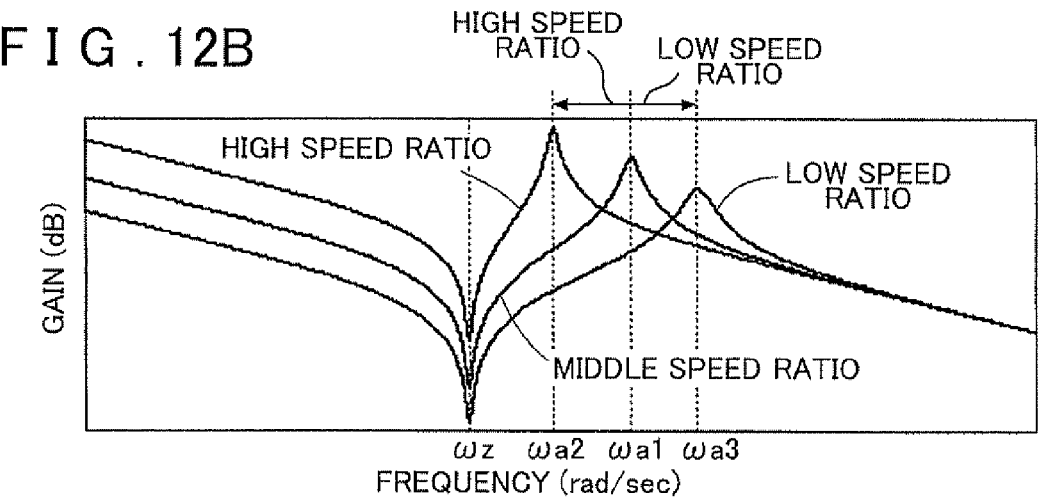

In addition, it is found from the formula (2) that the resonance frequency $\omega a$ decreases as the speed ratio Kr increases. In the resonance frequency $\omega a$ of the formula (2), the square of the speed ratio Kr is multiplied by the moment of inertia Jd on the rotary electric machine MG side so that variations in speed ratio Kr and variations in moment of inertia Jd, which depends on the engagement state, are interlocked with each other. Therefore, the resonance frequency $\omega a$ varies significantly. This interlocking also makes the tendency of variation in resonance frequency $\omega a$ due to variations in speed ratio Kr in the direct engagement state different from the tendency of variation in resonance frequency $\omega a$ due to variations in speed ratio Kr in the non-direct engagement state. FIGS. 12A and 12B show exemplary Bode diagrams for a case where the speed ratio Kr is varied. It is found also from the Bode diagram that the resonance frequency $\omega a$ decreases as the speed ratio Kr increases, and that the tendency of variation in resonance frequency $\omega a$ with respect to variations in speed ratio Kr varies in accordance with the engagement state. Thus, it is necessary to change the control constants of the vibration suppression rotational speed control section 40 in accordance with the speed ratio Kr so as to adapt to variations in resonance frequency $\omega a$ due to variations in speed ratio Kr.

3-4-4-2. Function of Transfer from External Input Torque to Rotational Speed of Rotary Electric Machine The external input torque Tw is input to the load (wheels) side, rather than to the rotary electric machine MG side. The external input torque Tw varies less rapidly and less frequently than the output torque Tm of the rotary electric machine MG, the output torque Te of the engine E, and the slip torque Tf. Thus, external input torque Tw, which is the external input torque Tw after conversion from a value input to the load (wheels) side into a value input to the rotary electric machine MG side, is less frequently subjected to resonant vibration at the frequency $\omega z$. Therefore, in the embodiment, the external input torque Tw after the conversion is assumed to be equal to the external input torque Tw before the conversion. In the following description, unless otherwise noted, the external input torque Tw after the conversion and the external input torque Tw before the conversion are not differentiated from each other, and are collectively referred to as "external input torque Tw".

Figure 13:
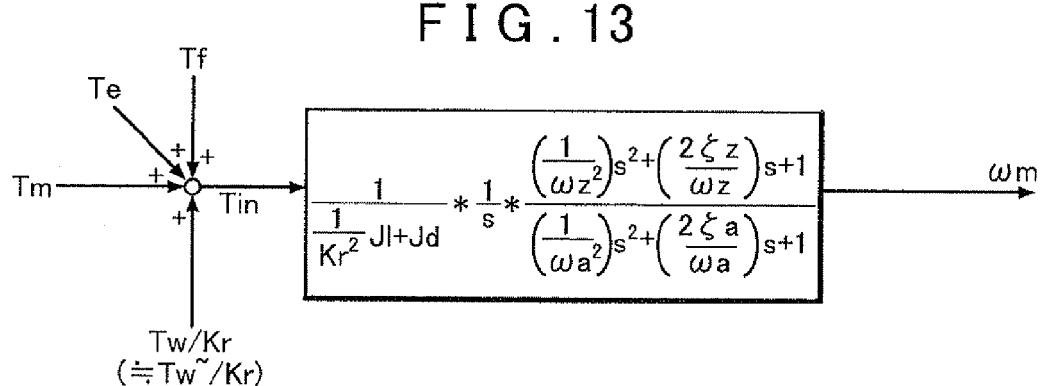
FIG. 13 is a block line diagram illustrating a process performed by the control device according to the embodiment of the present invention.

Therefore, in the embodiment, as shown in FIG. 13 and the upper right of FIG. 7, the function of transfer from the output torque Tm of the rotary electric machine MG, the output torque Te of the engine E, the slip torque Tf, and the external input torque Tw, which form the transfer system input torque Tin, to the rotational speed ωm of the rotary electric machine MG is commonalized to be modeled as the transfer function P(s). This commonalization makes it possible to collectively estimate the torques Tm, Te, Tf, and Tw, which form the transfer system input torque Tin, by performing signal processing on the rotational speed corn of the rotary electric machine MG as described later. Then, the external input torque Tw, which is input from the wheels W to the power transfer system 2, can be estimated on the basis of the estimated transfer system input torque Tin.

3-4-5. External Input Estimator 3-4-5-1. Estimation of Transfer System Input Torque As indicated by the formula (1) and as shown in FIGS. 13 and 7, the rotational speed corn of the rotary electric machine MG is a rotational speed obtained by dividing the transfer system input torque Tin by the moment of inertia (J1/Kr²+Jd) of the entire power transfer system, integrating the resulting quotient to derive a rotational speed, and adding the vibration component at the resonance frequency ωa, which is the natural vibration frequency of the power transfer system 2, to the derived rotational speed. Therefore, it is found that in estimating the transfer system input torque Tin on the basis of the rotational speed corn of the rotary electric machine MG, it is necessary to reduce at least the vibration component of the rotational speed corn of the rotary electric machine MG at the resonance frequency ωa. It is also found that the transfer system input torque Tin can be estimated by performing a differential computation process and multiplying the moment of inertia (J1/Kr²+Jd) of the entire power transfer system along with reducing the vibration component.

Therefore, as described above, the external input estimator 41 is configured to reduce the vibration component of the rotational speed coin of the power transfer system 2 at the rotational speed corn of the rotary electric machine MG and estimate the transfer system input torque Tin, which is torque input to the power transfer system 2 on the basis of the rotational speed corn of the rotary electric machine MG.

In the embodiment, as shown in FIG. 7, the external input estimator 41 includes an input torque estimator 45 configured to estimate the transfer system input torque Tin by performing at least a natural vibration reduction process Fr, which is signal processing for reducing the vibration component of the power transfer system 2, a differential computation process Fd, and a moment-of-inertia multiplication process Fjm, in which the moment of inertia of the power transfer system 2 is used, on the rotational speed corn of the rotary electric machine MG to calculate the estimated transfer system input torque Tin*. The order of the natural vibration reduction process Fr, the moment-of-inertia multiplication process Fjm, and the differential computation process Fd may be changed as desired.

In the example shown in FIG. 7, the input torque estimator 45 is set to perform signal processing set on the basis of 1/P(s), which is the inverse of the transfer function P(s), which corresponds to the characteristics of transfer from the output torque Tm of the rotary electric machine MG to the rotational speed ωm of the rotary electric machine MG shown in the formulas (1) and (2). In the example, the natural vibration reduction process Fr is set to a transfer function Pr(s), which is indicated by the following formula, on the basis of the inverse of two-inertia vibration characteristics.

[Formula 3]

$$Pr(s) = \frac{(1/\omega a^2)s^2 + 2(\zeta a/\omega a)s + 1}{(1/\omega z^2)s^2 + 2(\zeta z/\omega z)s + 1} \quad (3)$$

Figure 14A:
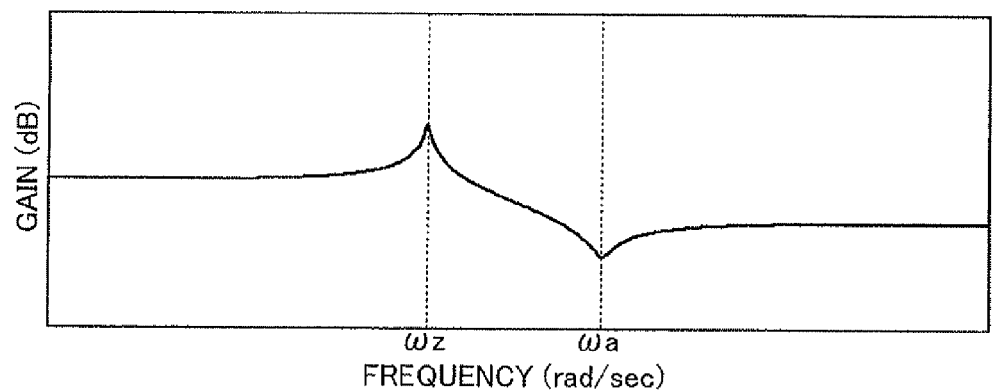
FIGS. 14A and 14B are Bode diagrams illustrating a process performed by the control device according to the embodiment of the present invention.

The transfer function Pr(s) of the natural vibration reduction process Fr has frequency characteristics that reduce the vibration component at the resonance frequency ωa, which is the natural vibration frequency of the power transfer system 2, as shown in the Bode diagram of FIG. 14A. In the example, the moment-of-inertia multiplication process Fjm is configured to multiply the moment of inertia (J1/Kr²+Jd) of the entire power transfer system. As indicated by the formula (2), each control constant of the input torque estimator 45 is changed in accordance with the moment of inertia Jd on the rotary electric machine MG side, which varies in accordance with the engagement state of the engine separation clutch CL, and changed in accordance with the speed ratio Kr, which varies in accordance with a change between shift speeds of the speed change mechanism TM.

Figure 14B:
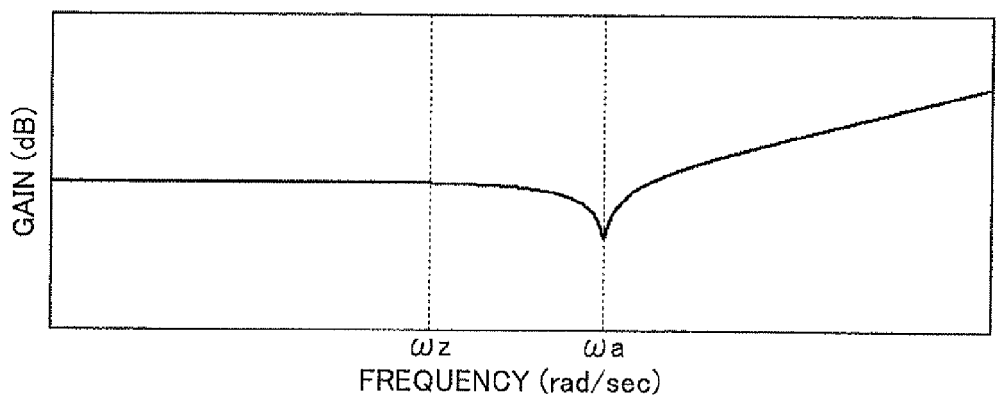

The transfer function Pr(s) of the natural vibration reduction process Fr may have frequency characteristics that reduce the vibration component at the resonance frequency ωa, which is the natural vibration frequency of the power transfer system 2, as shown in the Bode diagram of FIG. 14B.

Alternatively, the natural vibration reduction process Fr may be configured to apply a filtering process for cutting off a frequency band around the resonance frequency ωa, which is the natural vibration frequency of the power transfer system 2. A low-pass filtering process or a band-pass filtering process may be used as the filtering process. In this case, the frequency band to be filtered is changed in accordance with the engagement state or the speed ratio Kr.

In the embodiment, in the case where the engine separation clutch CL is in the direct engagement state, a shaft that drivably couples the engine E and the rotary electric machine MG to each other is treated as a rigid body for simplification from a three-inertia system into a two-inertia system. However, in the ease where the spring constant of the shaft between the engine E and the rotary electric machine MG is small, such as in the case where the output shaft Eo of the engine E is provided with a damper, there is a strong tendency that three-inertia torsional vibration occurs. In such a case, in order to adapt to the three-inertia torsional vibration, two natural vibration reduction processes Fr provided with different transfer functions (computation formulas) for each of the direct engagement state and the non-direct engagement state may be provided to switch between the natural vibration reduction processes Fr in accordance with the engagement state. In this case, the natural vibration reduction process Fr for the direct engagement state is set on the basis of the inverse of three-inertia vibration characteristics.

Alternatively, the vibration characteristics of the power transfer system 2 may be modeled into a higher-order transfer function, and the natural vibration reduction process Fr may be set on the basis of the inverse of the transfer characteristics of the transfer function. Alternatively, the natural vibration reduction process Fr may be set on the basis of the inverse of transfer characteristics of the power transfer system 2 calculated experimentally.

3-4-5-2. Estimation of External Input Torque

As described above, the transfer system input torque Tin includes the output torque Tm of the rotary electric machine MG and the output torque Te of the engine E or the slip torque Tf in addition to the external input torque Tw. Therefore, it is found that in estimating the external input torque Tw, which is input from the wheels W to the power transfer system 2, on the basis of the estimated transfer system input torque Tin*, it is necessary to subtract at least the output torque Tm of the rotary electric machine MG. It is also found that in addition to subtracting the output torque Tm of the rotary electric machine MG, it is necessary to further subtract the slip torque Tf in the case where the engine separation clutch CL is in the slipping engagement state and the slip torque Tf is produced, and to further subtract the output torque Te of the engine E in the case where the engine separation clutch CL is in the direct engagement state and the output torque Te of the engine E is produced.

Therefore, the external input estimator 41 is configured to estimate the external input torque Tw by subtracting at least the output torque Tm of the rotary electric machine MG from the estimated transfer system input torque Tin* as described above. In the embodiment, as shown in FIG. 7, the external input estimator 41 is configured to estimate the external input torque Tw by subtracting the output torque Tm of the rotary electric machine MG and the estimated slip torque Tf* from the estimated transfer system input torque Tin* in the case where the engine separation clutch CL is in the slipping engagement state. Meanwhile, the external input estimator 41 is configured to estimate the external input torque Tw by subtracting the output torque Tm of the rotary electric machine MG and the estimated slip torque Tf* from the estimated transfer system input torque Tin* in order to calculate estimated external input torque Twr* in the case where the engine separation clutch CL is in the direct engagement state. Here, the external input estimator 41 estimates the external input torque Tw converted to a value on the rotary electric machine MG side, which is torque (Tw/Kr) obtained by dividing the external input torque Tw by the speed ratio Kr. Therefore, the estimated external input torque Twr* is an estimated value of Tw/Kr. In the following description, the external input torque Tw converted to the value on the rotary electric machine MG side is simply referred to as "external input torque Tw".

Here, in the embodiment, the rotary electric machine control device 32 causes a relatively small response delay in torque output for the command value. Therefore, the output torque command value Tmo is set as the output torque Tm of the rotary electric machine MG. Alternatively, the rotary electric machine control device 32 may estimate the output torque Tm of the rotary electric machine MG on the basis of a current flowing through the rotary electric machine MG or the like.

During a change in transfer torque capacity of the engine separation clutch CL, an estimation error may be caused in the estimated transfer system input torque Tin*, and the estimated external input torque Twr* may vary from the actual external input torque Tw to cause an estimation error. Therefore, the external input estimator 41 may be adapted to hold the estimated external input torque Twr* estimated before a change in transfer torque capacity of the engine separation clutch CL at least during the change in transfer torque capacity of the engine separation clutch CL. This prevents occurrence of an estimation error in the estimated external input torque Twr due to an estimation error in the estimated transfer system input torque Tin*.

3-4-6. Low-vibration Speed Calculator

As described above, the low-vibration speed calculator 42 calculates the low-vibration rotational speed ωm^, which is a rotational speed obtained by reducing the vibration component of the rotational speed corn of the rotary electric machine MG, on the basis of the external input torque Tw and the vehicle required torque Tr, which is torque required to drive the wheels W.

In the embodiment, as shown in FIG. 7, the low-vibration speed calculator 42 is configured to perform a moment-of-inertia division process Fjd, in which the moment of inertia of the power transfer system 2 is used, on torque obtained by adding the external input torque Tw and the vehicle required torque Tr to calculate a rotational acceleration (angular acceleration), and to perform an integral computation process Fi on the rotational acceleration to calculate the low-vibration rotational speed ωm^. In the example, the moment-of-inertia division process Fjd is configured to divide the dividend by the moment of inertia $(J1/Kr^2+Jd)$ of the entire power transfer system.

The low-vibration speed calculator 42 sets an initial value of the low-vibration rotational speed core, that is, an initial value of the integral computation process Fi, to a rotational speed obtained by performing a filtering process for reducing the vibration component on the rotational speed ωo of the rotary electric machine MG. When an estimation error is caused in the estimated external input torque Twr*, the error is accumulated through the integral computation process Fi to cause an error in the low-vibration rotational speed ωm^. Therefore, in the embodiment, an initial value of the low-vibration rotational speed ωm^ is set in the case where the vibration suppression rotational speed control is started. An initial value of the low-vibration rotational speed ωm^ may also be set even during execution of the vibration suppression rotational speed control, in the case where the deviation between the filter-processed value of the rotational speed corn of the rotational speed MG and the low-vibration rotational speed ωm^ has become a predetermined value or more, in the case where variations in vehicle required torque Tr or external input torque Tw have become small, in the case where an operation to change the speed ratio Kr of the speed change mechanism TM is terminated, or the like.

3-4-7. Rotational Speed Controller

As described above, the rotational speed controller 43 calculates the feedback torque command value Tp which matches the rotational speed corn of the rotary electric machine MG with the low-vibration rotational speed ωm^.

In the embodiment, as shown in FIG. 7, the rotational speed controller 43 is configured to calculate the feedback torque command value Tp by performing feedback control on the basis of a rotational speed deviation Δωm obtained by subtracting the rotational speed corn of the rotary electric machine MG from the low-vibration rotational speed ωm^. Various feedback controllers such as a PID controller and a PI controller may be used as the rotational speed controller 43. The control constant of the rotational speed controller 43 is set on the basis of the transfer characteristics of the control subject, such as the transfer function P(s) of the shaft torsional vibration system indicated by the formula (1), so as to result in good convergence. As indicated by the formulas (1) and (2), the transfer characteristics of the control subject vary in accordance with the engagement state or the speed ratio Kr. Thus, the control constant of the rotational speed controller 43 is changed in accordance with the engagement state or the speed ratio Kr so as to result in good convergence.

In the engine start mode, as shown in the time chart to be described later, the output torque Tm of the rotary electric machine MG, the output torque Te of the engine E, and the slip torque Tf of the engine separation clutch CL are changed significantly in order to start the engine E through torque transfer from the rotary electric machine MG to the engine E via the engine separation clutch CL. Therefore, in the engine start mode, the total of these output torques may vary from the vehicle required torque Tr because of a control error, a control delay, and so forth to cause a torque shock and shaft torsional vibration of the power transfer system 2.

Therefore, the rotational speed controller 43 may be configured to calculate the feedback torque command value Tp during at least a part of a period since a transfer torque capacity starts being produced between the engagement members of the engine separation clutch CL until the direct engagement state, in which the rotational speeds of the engagement members of the engine separation clutch CL match each other, is established in order to start the engine E through torque transfer from the rotary electric machine MG to the engine E via the engine separation clutch CL. This allows suppression of shaft torsional vibration using the feedback torque command value Tp calculated by the rotational speed controller 43 at least in the engine start mode, in which shaft torsional vibration may be produced. The feedback torque command value Tp may be calculated only in the engine start mode.

3-4-8. Torque Command Value Calculator

As described above, the torque command value calculator 44 calculates the output torque command value Tmo, which is a command value of the output torque Tm of the rotary electric machine MG, on the basis of the vehicle required torque Tr and the feedback torque command value Tp.

In the embodiment, as shown in FIG. 7, the torque command value calculator 44 is configured to calculate the output torque command value Tmo by adding the feedback torque command value Tp to the rotary electric machine required torque Tb, which is derived on the basis of the vehicle required torque Tr. As described above, the rotary electric machine required torque Tb is obtained by subtracting the estimated slip torque Tf* or the estimated engine output torque Te*, depending on the engagement state, from the vehicle required torque Tr. The rotary electric machine control device 32 controls the rotary electric machine MG via an inverter or the like such that the rotary electric machine MG outputs torque corresponding to the output torque command value Tmo.

3-4-9. Behavior of Vibration Suppression Rotational Speed Control

Figure 8:
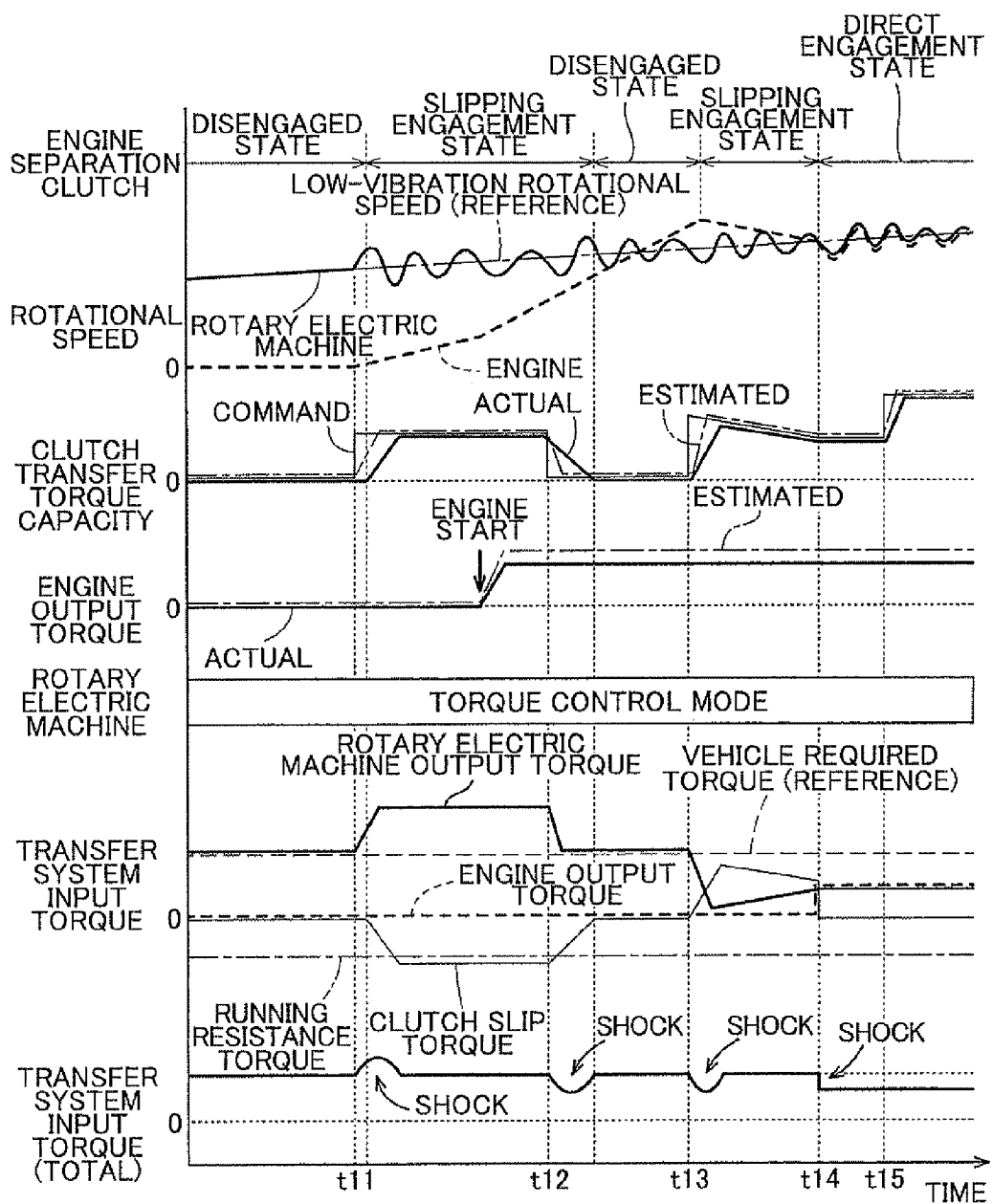
FIG. 8 is a time chart illustrating a process performed by the control device according to the embodiment of the present invention.
Figure 9:
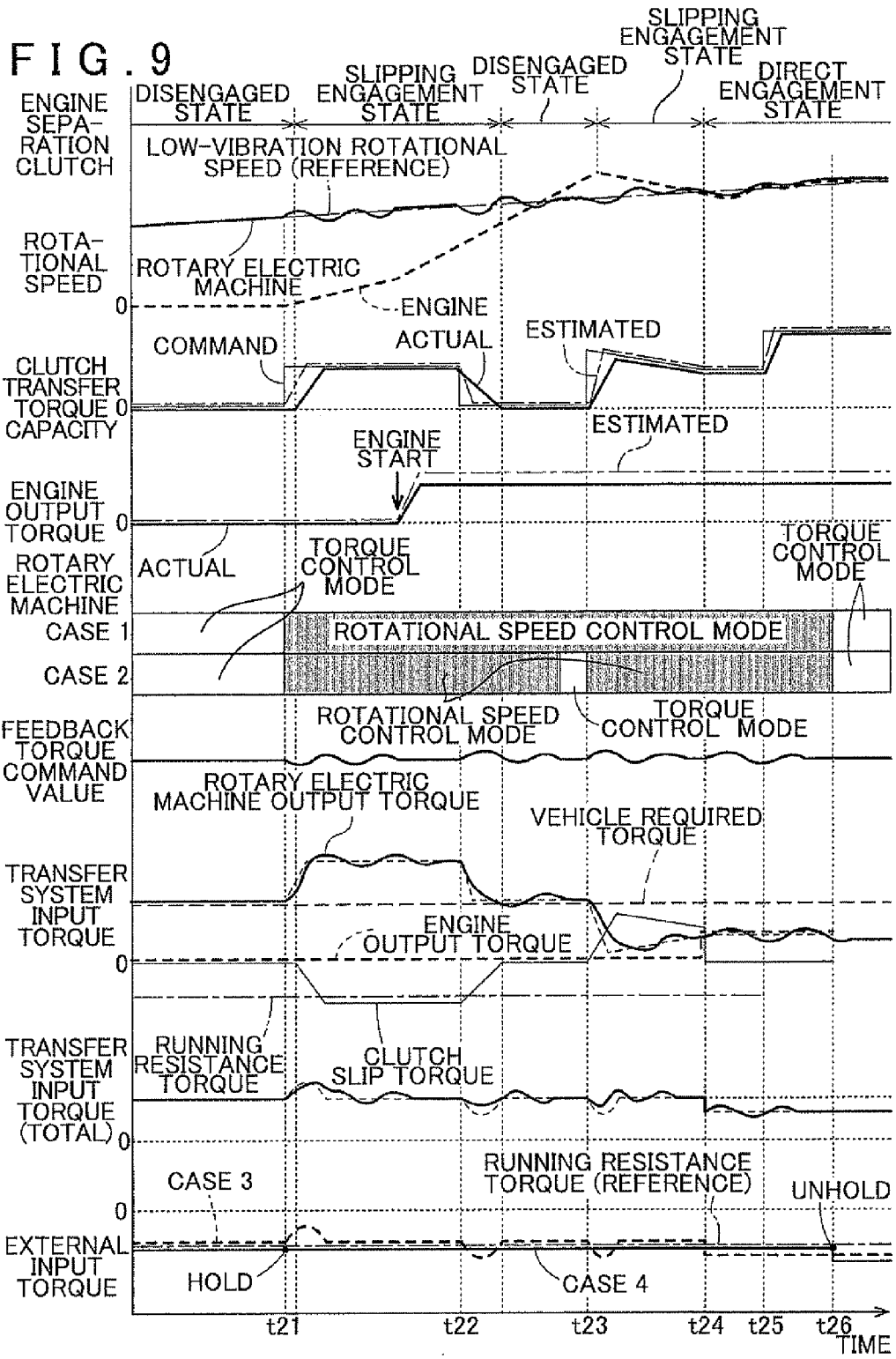
FIG. 9 is a time chart illustrating a process performed by the control device according to the embodiment of the present invention.

Next, the behavior of the vibration suppression rotational speed control performed by the vibration suppression rotational speed control section 40 will be described with reference to the time charts shown in the example of FIGS. 8 and 9. FIGS. 8 and 9 each show a case where the engine separation clutch CL is switched between the non-direct engagement state and the direct engagement state in the engine start mode. FIG. 8 shows a case where the vibration suppression rotational speed control is not performed, and FIG. 9 shows a case where the vibration suppression rotational speed control is performed.

3-4-9-1. Without Vibration Suppression Rotational Speed Control

First, the example of FIG. 8 will be described. In order to start the engine E in the electric drive mode, in which the vehicle is driven using the rotational drive force of the rotary electric machine MG with the engine E stationary, the transfer torque capacity of the engine separation clutch CL is increased from zero (time t11) to bring the engine separation clutch CL from the disengaged state into the slipping engagement state. After the target transfer torque capacity (command) of the engine separation clutch CL is increased, the actual transfer torque capacity varies with a response delay of the hydraulic pressure supply system. In the example, an error in the phase advance direction is caused in the estimated value of the transfer torque capacity with respect to the actual transfer torque capacity, and an estimation error in the phase advance direction is also caused in the estimated slip torque Tf*, which is calculated by multiplying the estimated value of the transfer torque capacity by a positive or negative sign.

The estimation error causes an error in the phase advance direction in increase and decrease in rotary electric machine required torque Tb, which is calculated by subtracting the estimated slip torque Tf* from the vehicle required torque Tr so as to cancel variations in slip torque Tf. Therefore, torque obtained by totaling the output torque Tm of the rotary electric machine MG and the slip torque Tf varies from the vehicle required torque Tr at the timing when the transfer torque capacity is changed, causing a torque shock. The torque shock excites vibration in the shaft torsional vibration system at the natural vibration frequency of the shaft torsional vibration system. In the example shown in FIG. 8, the vibration suppression rotational speed control is not performed, and therefore the vibration is damped to a small degree to continue after excitation of the vibration. A low-vibration rotational speed ωm^ calculated in the case where the vibration suppression rotational speed control is performed is shown only for reference. It is found that the rotational speed corn of the rotary electric machine MG vibrates around the low-vibration rotational speed ωm^, and that the vibration can be suppressed by performing the vibration suppression rotational speed control.

When the transfer torque capacity of the engine separation clutch CL is increased from zero, positive slip torque Tf with the magnitude corresponding to the transfer torque capacity is transferred from the engine separation clutch CL to the engine E side to increase the rotational speed toe of the engine E. When the rotational speed we of the engine E is increased to a predetermined rotational speed, fuel is supplied to the engine E to start combustion in the engine E. After the engine E is started, the estimated engine output torque Te* is increased. In the example, an estimation error is caused to make the estimated engine output torque Te* higher than the actual output torque Te of the engine E.

In the engine start mode according to the example, when it is determined that starting of the engine E has been completed, the transfer torque capacity of the engine separation clutch CL is temporarily decreased to zero to bring the engine separation clutch CL into the disengaged state (time t12). A torque shock is caused in the total value of Tm and Tf because of an estimation error in the slip torque Tf, as in the case where the transfer torque capacity is increased at time t11. Therefore, vibration is excited also at this timing.

When the rotational speed we of the engine E is raised by the output torque Te of the engine E to exceed the rotational speed ωm of the rotary electric machine MG, the transfer torque capacity of the engine separation clutch CL is increased again (time t13). Also at this timing, a torque shock is caused because of an estimation error in the slip torque Tf to excite vibration. Since the rotational speed ωe of the engine E is higher than the rotational speed corn of the rotary electric machine MG, negative slip torque Tf with the magnitude corresponding to the transfer torque capacity is transferred from the engine separation clutch CL to the engine E side to decrease the rotational speed ωe of the engine E. On the other hand, positive slip torque Tf with the magnitude corresponding to the transfer torque capacity is transferred from the engine separation clutch CL to the rotary electric machine MG side. Thus, the output torque Tm of the rotary electric machine MG is decreased on the basis of the estimated slip torque Tf* so as to cancel the slip torque Tf.

When the rotational speed ωe of the engine E decreases to the rotational speed ωm of the rotary electric machine MG so that the rotational speeds of the engagement members of the engine separation clutch CL match each other, the engine separation clutch CL is brought into the direct engagement state (time t14). At this time, the slip torque Tf decreases to zero, and instead, the output torque Te of the engine E is transferred to the rotary electric machine MG side, and increased from zero. In order to cancel the decrease in slip torque Tf and the increase in engine output torque Te, the output torque Tm of the rotary electric machine MG is changed on the basis of the estimated slip torque Tf* and the estimated engine output torque Te*. In the example, an offset estimation error is caused in the estimated engine output torque Te*. Thus, the total of the torques varies stepwise to cause a torque shock. Therefore, vibration is excited also at the timing when the direct engagement state is established. At time t15, the transfer torque capacity of the engine separation clutch CL is increased to terminate the engine start mode (time t15).

In the engine start mode, as shown in the example, the output torque Tm of the rotary electric machine MG, the output torque Te of the engine E, and the slip torque Tf of the engine separation clutch CL are changed significantly. Therefore, in the engine start mode, it is highly likely that the total of these output torques varies from the vehicle required torque Tr because of a control error, a control delay, and so forth to cause a torque shock and shaft torsional vibration of the power transfer system 2.

It is found that the rotational speed ωm of the rotary electric machine MG vibrates around the low-vibration rotational speed ωmˆ shown only for reference, and that the vibration can be suppressed by performing the vibration suppression rotational speed control.

3-4-9-2. With Vibration Suppression Rotational Speed Control

Next, FIG. 9 shows a case where the vibration suppression rotational speed control is performed under the same drive conditions as those in FIG. 8. As described above, FIG. 8 shows a case where the vibration suppression rotational speed control is not performed, and FIG. 9 shows a case where the vibration suppression rotational speed control is performed. In FIG. 9, performing the vibration suppression rotational speed control decreases the deviation of the rotational speed ωm of the rotary electric machine MG with respect to the low-vibration rotational speed ωmˆ, decreasing the amplitude of torsional vibration.

FIG. 9 shows a case where the rotational speed controller 43 is configured to calculate the feedback torque command value Tp during at least a part of a period since the transfer torque capacity of the engine separation clutch CL starts being increased from zero until the engine separation clutch CL is brought into the direct engagement state in order to start the engine in the engine start mode. A case 1 corresponds to a case where the rotational speed control mode is executed, with the control mode of the rotary electric machine MG changed from the torque control mode to the rotational speed control mode, all during the period in the engine start mode. The control mode is set to the rotational speed control mode during a predetermined period after the termination of the engine start mode. A case 2 corresponds to a case where the control mode is changed from the torque control mode to the rotational speed control mode during a predetermined period after the transfer torque capacity of the engine separation clutch CL is changed. In the example shown in FIG. 9, the control mode is changed to the torque control mode during a part of the period in which the disengaged state is established.

The predetermined periods for the case 1 and the case 2 are each set to a period set in advance since the transfer torque capacity is changed, or the direct engagement state is established, until vibration is settled.

The feedback torque command value Tp matching a deviation Δω between the low-vibration rotational speed ωmˆ and the rotational speed ωm of the rotary electric machine MG is calculated through the vibration suppression rotational speed control. This allows the output torque Tm of the rotary electric machine MG to vary by an amount corresponding to variations in feedback torque command value Tp with respect to the rotary electric machine required torque Tb. In addition, the total value of the transfer system input torque Tin is varied by an amount corresponding to variations in feedback torque command value Tp compared to the case of FIG. 8 where the vibration suppression rotational speed control is not performed.

The external input estimator 41 subtracts the output torque Tm of the rotary electric machine MG from the estimated transfer system input torque Tin. Thus, variations in each of Tin and Tm due to variations in feedback torque command value Tp can be canceled. Therefore, the estimated external input torque Twr* indicated by a case 3 is not affected by variations in feedback torque command value Tp, allowing estimation of the external input torque Tw with high accuracy. The case 3 corresponds to a case where the external input estimator 41 calculates the estimated external input torque Twr* all during execution of the vibration suppression rotational speed control.

Therefore, the low-vibration rotational speed ωmˆ, which is estimated on the basis of the vehicle required torque Tr and the estimated external input torque Twr*, is calculated with high accuracy irrespective of variations in feedback torque command value Tp. In the example, the vehicle required torque Tr and the external input torque (running resistance torque) are not varied. However, even if these torques are varied, the acceleration of the low-vibration rotational speed ωmˆ can be varied in a feedforward manner in accordance with the variations in the torques, preventing a delay in variation in low-vibration rotational speed ωmˆ. Thus, a response delay in the behavior of the rotational speed corn of the rotary electric machine MG can be prevented by performing the vibration suppression rotational speed control.

A case 4 corresponds to a ease where the estimated external input torque Twr* estimated before a change in transfer torque capacity of the engine separation clutch CL is held during the change in transfer torque capacity of the engine separation clutch CL. In the example of FIG. 9, the estimated external input torque Twr* is held during the engine start mode. This prevents occurrence of an estimation error in the estimated external input torque Twr* due to an estimation error in the estimated transfer system input torque Tin* even during the engine start mode, in which the input torques are varied significantly.

3-4-10. Model during Shifting

Figure 4:
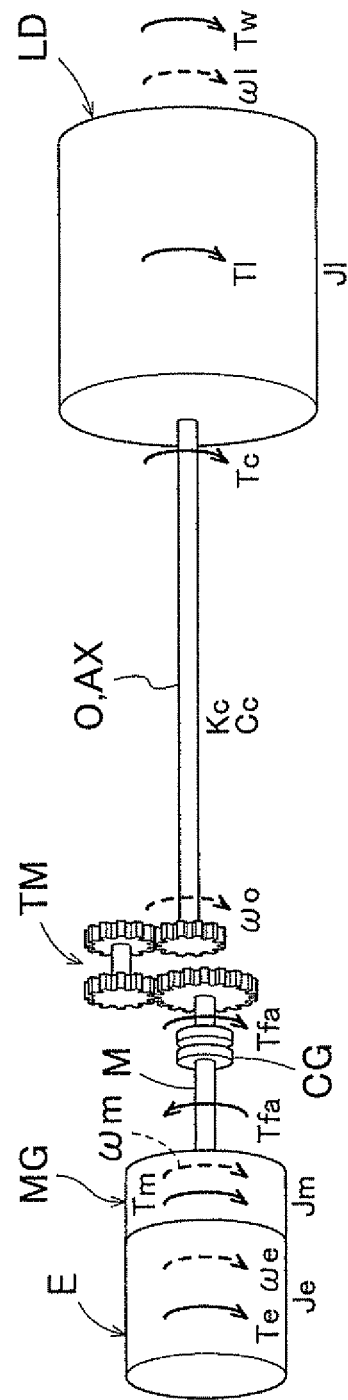
FIG. 4 shows a model of the power transfer system according to the embodiment of the present invention.

Next, a case where the speed change engagement element of the speed change mechanism TM is in the non-direct engagement state will be described. As shown in FIG. 4, in the case where the speed change engagement element is in the slipping engagement state or the disengaged state, the slip torque Tfa of the speed change engagement element is transferred, or no torque is transferred, between the inertia system on the rotary electric machine MG side and the inertia system on the load LD (vehicle) side. Therefore, the torsional torque Tc of the output shaft is not transferred between the two inertia systems. Thus, each inertia system serves as an independent one-inertia system, and no torsional vibration is produced by torsion of the output shaft between the two inertia systems.

Figure 6:
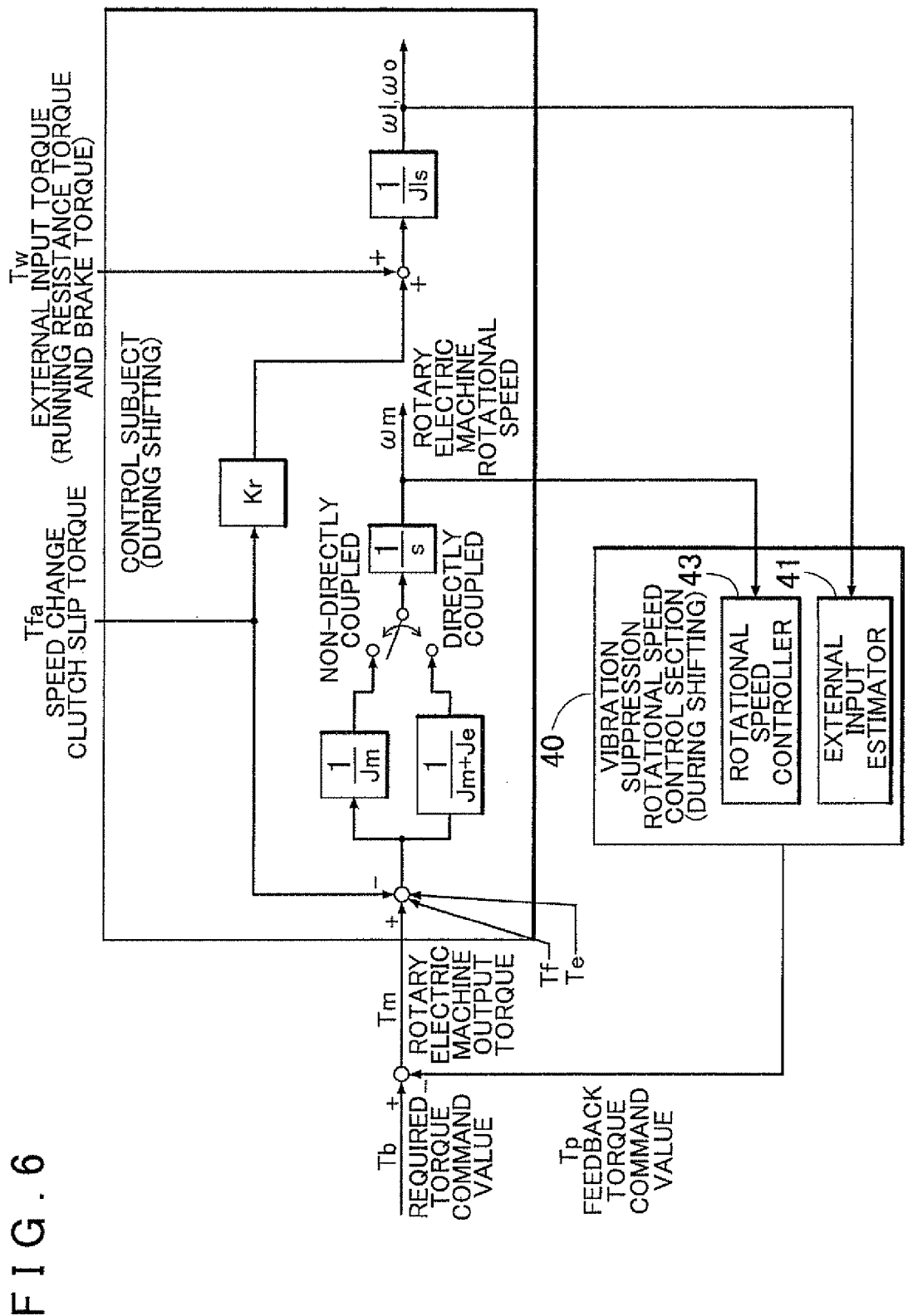
FIG. 6 is a block line diagram of the power transfer system and the control device according to the embodiment of the present invention.

Therefore, as shown in the block line diagram of the power transfer system 2 during shifting of FIG. 6, the transfer system input torque Tin input to the inertia system on the rotary electric machine MG side is formed by the output torque Tm of the rotary electric machine MG, the output torque Te of the engine E, and the slip torque Tf of the engine separation clutch CL, and the transfer system input torque Tin input to the inertia system on the load LD (vehicle) side is formed by the external input torque Tw. Therefore, during shifting, information on the external input torque Tw cannot be obtained by observing the rotational speed ωm of the rotary electric machine MG, which is the rotational speed of the inertia system on the rotary electric machine MG side. Therefore, during shifting, as described later, the external input estimator 41 of the vibration suppression rotational speed control section 40 estimates the external input torque Twr, which is input from the wheels W to the power transfer system 2, on the basis of the rotational speed ωo of the output shaft O, which is provided on the wheels W side with respect to the speed change mechanism TM, in place of the rotational speed ωm of the rotary electric machine MG.

3-4-11. External Input Estimator during Shifting
3-4-11-1. Estimation of Transfer System Input Torque During Shifting As shown in FIG. 6, the wheel-side input torque Tinw, which is torque input to the inertia system on the load LD (vehicle) side, is formed by the external input torque Tw and torque obtained by multiplying the slip torque Tfa of the speed change engagement element by the speed ratio Kr. Therefore, the rotational speed ωo of the output shaft O is obtained by totaling the external input torque Tw and torque obtained by multiplying the slip torque Tfa of the speed change engagement element by the speed ratio Kr, dividing the resulting torque by the moment of inertia 31 of the load LD (vehicle), and integrating (1/s) the quotient. Therefore, the wheel-side input torque Tinw can be calculated by performing a computation process in the reverse direction, that is, performing a differential computation process on the rotational speed ωo of the output shaft O and multiplying the resulting value by the moment of inertia 31 of the load LD (vehicle). Then, it is found that the external input torque Tw can be calculated by subtracting torque obtained by multiplying the slip torque Tfa of the speed change engagement element by the speed ratio Kr from the wheel-side input torque Tinw. As described above, in addition, the power transfer control device 33 controls the slip torque Tfa of the speed change engagement element to the vehicle required torque Tr. Therefore, the external input torque Tw can be calculated by subtracting torque obtained by multiplying the vehicle required torque Tr by the speed ratio Kr from the wheel-side input torque Tinw. Moreover, the rotary electric machine required torque Tb required for the rotary electric machine MG is set on the basis of the vehicle required torque Tr. Therefore, at least the output torque Tm of the rotary electric machine MG can be used in place of the vehicle required torque Tr.

Therefore, during an operation to change the speed ratio Kr, in which the speed change engagement element is brought into the slipping engagement state, the external input estimator 41 estimates the wheel-side input torque Tinw, which is torque input to the wheels W side, on the basis of the rotational speed no of the output shaft O, which is provided on the wheels W side with respect to the speed change mechanism TM in the power transfer system 2, in place of the rotational speed ωm of the rotary electric machine MG. Then, the external input estimator 41 estimates wheel-side external input torque Tww, which is input from the wheels W to the output shaft O, by subtracting torque, which is obtained by multiplying the output torque Tm of the rotary electric machine MG or the vehicle required torque Tr by the speed ratio Kr, from the estimated wheel-side input torque Tinw*, and estimates the external input torque Tw by dividing estimated wheel-side external input torque Tww* (see FIG. 10) by the speed ratio Kr.

Figure 10:
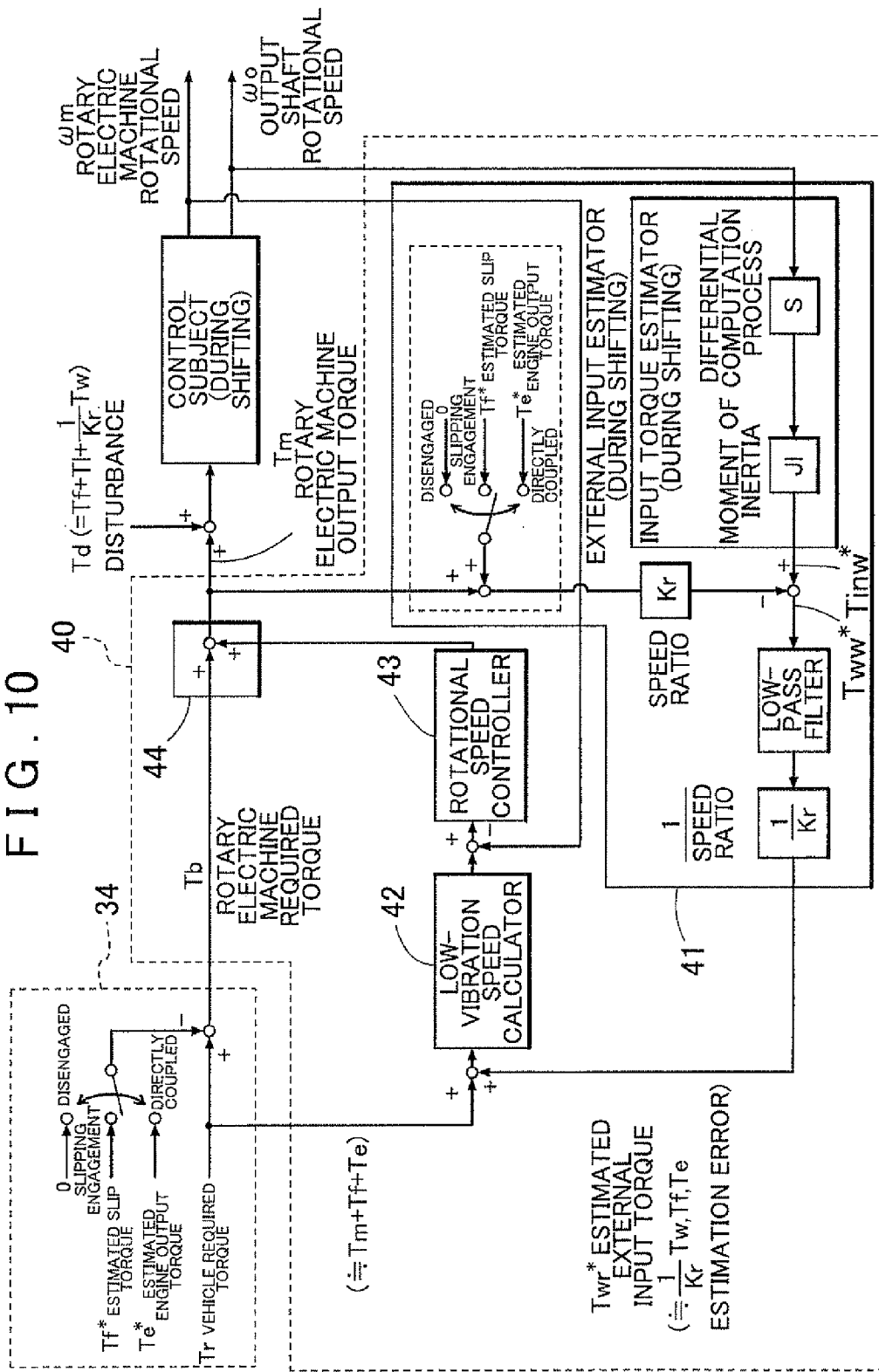
FIG. 10 is a block diagram showing the configuration of the control device according to the embodiment of the present invention.

In the embodiment, as shown in FIG. 10, during an operation to change the speed ratio Kr, the external input estimator 41 estimates the wheel-side input torque Tinw by performing a differential computation process on the rotational speed ωo of the output shaft O and multiplying the resulting value by the moment of inertia J1 of the load LD (vehicle). Then, the external input estimator 41 estimates the wheel-side external input torque Tww by multiplying torque obtained by adding the estimated slip torque Tf* or the estimated engine output torque Te*, depending on the engagement state of the engine separation clutch CL, to the output torque Tm of the rotary electric machine MG by the speed ratio Kr and subtracting the resulting torque from the estimated wheel-side input torque Tinw*, as in the case other than during shifting described above. The external input estimator 41 estimates the external input torque Tw by performing a low-pass filtering process on the estimated wheel-side external input torque Tww* to remove noise and dividing the resulting value by the speed ratio Kr.

Alternatively, the external input estimator 41 may be configured to remain in the configuration of the external input estimator 41 shown in FIG. 7, rather than to be changed to the configuration of the external input estimator 41 set for use during a speed change operation shown in FIG. 10 as described above, during an operation to change the speed ratio Kr, and to hold the estimated external input torque Twr* estimated before the operation to change the speed ratio during the operation to change the speed ratio Kr. With such a configuration, occurrence of an estimation error in the external input torque Tw during a speed change operation can be prevented without providing the external input estimator 41 with a configuration set for use during a speed change operation. In this case, in addition, the external input estimator 41 may hold the estimated external input torque Twr* to be finally output from the external input estimator 41, and the input torque estimator 45 may continue computation during a speed change operation. This allows the input torque estimator 45 to continue computation while the estimated external input torque Twr* is held, preventing occurrence of initial variations in value of the estimated external input torque Twr* at the start of computation performed by the input torque estimator 45, and making it possible to stabilize the value of the estimated external input torque Twr* from the time when the estimated external input torque Twr* is unheld.

The external input estimator 41 may include a plurality of speed ratio-specific estimators having different constants set for each speed ratio Kr. Each of the speed ratio-specific estimators may be configured to be capable of calculating the estimated external input torque Twr* for each speed ratio in parallel. During an operation to change the speed ratio Kr performed by the speed change mechanism TM, the speed ratio-specific estimator corresponding to the speed ratio Kr before the speed change operation may hold the estimated external input torque Twr* estimated before the speed change operation. With such a configuration, the estimated external input torque Twr* corresponding to the speed ratio Kr before a speed change operation can be held during the speed change operation to prevent occurrence of an estimation error. In addition, the estimated external input torque Twr* corresponding to the speed ratio Kr after the speed change operation can be also calculated during the speed change operation. Therefore, the value of the estimated external input torque Twr* corresponding to the speed ratio Kr after the speed change operation can be stabilized from the time when the speed change operation is terminated and the estimated external input torque Twr* is unheld.

3-4-12. Behavior of External Input Estimator during Shifting

Next, the behavior of the external input estimator 41 during shifting will be described with reference to the time chart shown in the example of FIG. 15. In the example shown in FIG. 15, during a period from time t31 to time t32, the speed change engagement element is brought into the slipping engagement state, and an operation to change the speed ratio Kr from a first shift speed to a second shift speed with a lower speed ratio. If the external input estimator 41 which is set for use with the speed change engagement element in the direct engagement state as shown in FIG. 7 is used during the speed change operation, the external input torque Tw is estimated on the basis of the rotational speed ωm of the rotary electric machine MG as described above. Therefore, a significant estimation error may be caused in the estimated external input torque Twr*, such as by estimating the estimated external input torque Twr* on the basis of the slip torque Tfa of the speed change engagement element. Such estimated external input torque Twr* is indicated as external input torque for the first shift speed and external input torque for the second shift speed in FIG. 15.

FIG. 10 shows a case 5 where the external input estimator 41 set for use during an operation to change the speed ratio Kr is used. In this case, the estimated external input torque Twr* is calculated by estimating the wheel-side external input torque Tww, which is the external input torque converted to a value on the wheels side on the basis of the rotational speed ωo of the output shaft O, from which information on the external input torque Tw can be obtained, and dividing the estimated wheel-side external input torque Tww by the speed ratio Kr so as to convert the wheel-side external input torque Tww to a value on the rotary electric machine MG side. Therefore, as shown in FIG. 15, the estimated wheel-side external input torque Tww* is not varied and stable during a speed change operation, and the estimated external input torque Twr*, which is calculated by dividing the estimated wheel-side external input torque Tww* by the speed ratio Kr, is also not varied significantly and stable.

FIG. 10 also shows a case 6 where the behavior in the case where the plurality of speed ratio-specific estimators of the external input estimator 41 each calculate the estimated external input torque Twr* in parallel and the estimated external input torque Twr* estimated before a speed change operation by the speed ratio-specific estimator corresponding to the speed ratio Kr before the speed change operation is held during the speed change operation. Variations in estimated external input torque Twr* can be prevented, even during a speed change operation, in the case where the estimated external input torque Twr* is held, compared to the case where the estimated external input torque Twr* is not held, which results in significant variations in estimated value. Then, in the case where it is determined that the estimated external input torque Twr* (external input torque for the second shift speed) of the speed ratio-specific estimator corresponding to the speed ratio Kr after the speed change operation has been stabilized (time t34), the estimated external input torque Twr* is unheld, and the estimated external input torque Twr* corresponding to the speed ratio Kr after the speed change operation is output. Therefore, variations in estimated external input torque Twr* during the speed change operation can be prevented. In addition, the estimated external input torque Twr* corresponding to the speed ratio Kr after the speed change operation is calculated while the estimated external input torque Twr* is held. Therefore, the estimated value can be switched smoothly.

4. Other Embodiments

Lastly, other embodiments of the present invention will be described. The configuration of each embodiment described below is not limited to its independent application, and may be applied in combination with the configuration of other embodiments unless any contradiction occurs.

(1) In the above embodiment, the speed change mechanism TM is a stepped automatic transmission. However, the present invention is not limited thereto. That is, in one preferred embodiment of the present invention, the speed change mechanism TM may be a transmission other than the stepped automatic transmission, such as a continuously variable automatic transmission capable of continuously changing the speed ratio. Also in this case, the vibration suppression rotational speed control section 40 is configured to change the control constants of the vibration suppression rotational speed control section 40, the external input estimator 41, the low-vibration speed calculator 42, and the rotational speed controller 43 in accordance with the speed ratio of the continuously variable automatic transmission. In this case, in addition, the external input estimator 41 which uses the rotational speed ωm of the rotary electric machine MG shown in FIG. 7 may be configured not to perform the holding operation for use during an operation to change the speed ratio, even during the speed change operation.

(2) In the above embodiment, the engine separation clutch CL is a friction engagement element. However, the present invention is not limited thereto. That is, in one preferred embodiment of the present invention, the engine separation clutch CL may be an engagement device other than the friction engagement element, such as an electromagnetic clutch or a meshing-type clutch. In this case, the vibration suppression rotational speed control section 40 may be configured to determine that the direct engagement state is established in the case where the engine E and the rotary electric machine MG are rotating together with each other, and to determine that the non-direct engagement state is established otherwise.

(3) In the above embodiment, the hybrid vehicle includes the control devices 31 to 34, and the rotary electric machine control device 32 includes the vibration suppression rotational speed control section 40. However, the present invention is not limited thereto. That is, the rotary electric machine control device 32 may be provided as a control device integrated with any combination of the plurality of control devices 31, 33, and 34. Also, the functional sections provided to the control devices 31 to 34 may be distributed in any combination.

(4) In one preferred embodiment of the present invention, as opposed to the above embodiment, a friction engagement element that drivably couples and decouples the rotary electric machine MG and the wheels W to and from each other (that is, maintains and releases the coupling between the rotary electric machine MG and the wheels W) or a friction engagement element that brings a torque converter and input and output members of the torque converter into the direct engagement state may be provided separately from the speed change mechanism TM. In this case, the vibration suppression rotational speed control section 40 may determine that an operation to change the speed ratio Kr is being performed in the case where such a friction engagement element is in the non-direct engagement state, and the external input estimator 40 may hold the estimated external input torque Twr* or be changed to the configuration of the external input estimator 40 for use during a speed change operation as described above.

The present invention may be suitably applied to a control device that controls a rotary electric machine that is provided in a power transfer system from a drive force source for a vehicle to wheels and serves as the drive force source.

What is claimed is:

1. A control device that controls a rotary electric machine that is provided in a power transfer system from a drive force source for a vehicle to wheels and serves as the drive force source, the control device comprising:
    an external input estimator that reduces a vibration component of a rotational speed of the power transfer system at a rotational speed of the rotary electric machine and estimates transfer system input torque, which is torque input to the power transfer system, on the basis of the rotational speed of the rotary electric machine, and that estimates external input torque, which is input from the wheels to the power transfer system, by subtracting at least output torque of the rotary electric machine from the transfer system input torque;
    a low-vibration speed calculator that calculates a low-vibration rotational speed, which is a rotational speed obtained by reducing a vibration component produced in the rotational speed of the rotary electric machine, on the basis of the external input torque and vehicle required torque, which is torque required to drive the wheels;
    a rotational speed controller that calculates feedback command torque that matches the rotational speed of the rotary electric machine with the low-vibration rotational speed; and
    a torque command value calculator that calculates an output torque command value, which is a command value of the output torque of the rotary electric machine, on the basis of the vehicle required torque and the feedback command torque.

2. The control device according to claim 1, wherein:
    the external input estimator estimates the transfer system input torque by performing, on the rotational speed of the rotary electric machine, a multiplication process using a moment of inertia of the power transfer system, a differential computation process, and signal processing for reducing at least a vibration component of the power transfer system, and estimates the external input torque by subtracting the output torque of the rotary electric machine from the transfer system input torque; and
    the low-vibration speed calculator calculates the low-vibration rotational speed by performing, on torque obtained by adding the external input torque and the vehicle required torque, a division process using the moment of inertia of the power transfer system and an integral computation process.

3. The control device according to claim 1, wherein:
    the rotary electric machine is selectively drivably coupled to an internal combustion engine serving as the drive force source in accordance with an engagement state of an engagement device; and
    at least during a change in transfer torque capacity of the engagement device, the external input estimator holds the external input torque estimated before the change in transfer torque capacity of the engagement device.

4. The control device according to claim 1, wherein:
    the rotary electric machine is selectively drivably coupled to an internal combustion engine serving as the drive force source in accordance with an engagement state of an engagement device; and
    in a slipping engagement state, in which a transfer torque capacity is produced with a difference in rotational speed between engagement members of the engagement device, the external input estimator estimates the external input torque by subtracting the output torque of the rotary electric machine and slipping torque, which is transfer torque of the engagement device, from the transfer system input torque.

5. The control device according to claim 1, wherein:
    the rotary electric machine is selectively drivably coupled to an internal combustion engine serving as the drive force source in accordance with an engagement state of an engagement device; and
    the rotational speed controller calculates the feedback command torque during at least a part of a period since the transfer torque capacity starts being produced between engagement members of the engagement device until a direct engagement state, in which rotational speeds of the engagement members of the engagement device match each other, is established in order to start the internal combustion engine through torque transfer from the rotary electric machine to the internal combustion engine via the engagement device.

6. The control device according to claim 1, wherein:
    the rotary electric machine is drivably coupled to the wheels via a speed change mechanism with a changeable speed ratio; and
    during an operation to change the speed ratio performed by the speed change mechanism, the external input estimator estimates wheel-side input torque, which is torque input to a side of the wheels, on the basis of an output rotational speed, which is a rotational speed of an output member provided on the side of the wheels with respect to the speed change mechanism in the power transfer system, in place of the rotational speed of the rotary electric machine, estimates wheel-side external input torque, which is input from the wheels to the output member, by subtracting the output torque of the rotary electric machine or torque obtained by multiplying the vehicle required torque by the speed ratio from the wheel-side input torque, and estimates the external input torque by dividing the wheel-side external input torque by the speed ratio.

7. The control device according to claim 1, wherein:
    the rotary electric machine is drivably coupled to the wheels via a speed change mechanism with a changeable speed ratio; and
    the external input estimator includes a plurality of speed ratio-specific estimators having different constants set for each speed ratio, each of the speed ratio-specific estimators is configured to calculate the external input torque for each speed ratio in parallel, and during an operation to change the speed ratio performed by the speed change mechanism, the speed ratio-specific estimator corresponding to the speed ratio before the speed change operation holds the external input torque estimated before the speed change operation.

8. The control device according to claim 1, wherein:

the rotary electric machine is selectively drivably coupled to an internal combustion engine serving as the drive force source in accordance with an engagement state of an engagement device; and in a direct engagement state, in which a transfer torque capacity is produced with no difference in rotational speed between engagement members of the engagement device, the external input estimator estimates the external input torque by subtracting the output torque of the rotary electric machine and output torque of the internal combustion engine from the transfer system input torque.

9. The control device according to claim 1, wherein the external input estimator estimates the transfer system input torque by performing, on the rotational speed of the rotary electric machine, signal processing set on the basis of an inverse of characteristics of transfer from the output torque of the rotary electric machine to the rotational speed of the rotary electric machine, and estimates the external input torque by subtracting the output torque of the rotary electric machine from the transfer system input torque.

10. The control device according to claim 1, wherein:

the rotary electric machine is selectively drivably coupled to an internal combustion engine serving as the drive force source in accordance with an engagement state of an engagement device, and drivably coupled to the wheels via a speed change mechanism with a changeable speed ratio; and control constants of the external input estimator, the low-vibration speed calculator, and the rotational speed controller are changed in accordance with one or both of the engagement state of the engagement device and the speed ratio of the speed change mechanism.

11. The control device according to claim 1, wherein the low-vibration speed calculator sets an initial value of the low-vibration rotational speed to a rotational speed obtained by performing a filtering process for reducing the vibration component of the rotational speed of the rotary electric machine on the rotational speed of the rotary electric machine.

* * * * *